(12) United States Patent
Heckey et al.

(10) Patent No.: US 11,605,016 B2
(45) Date of Patent: Mar. 14, 2023

(54) QUANTUM COMPUTING SERVICE SUPPORTING LOCAL EXECUTION OF HYBRID ALGORITHMS

(71) Applicant: Amazon Technologies, Inc., Seattle, WA (US)

(72) Inventors: Jeffrey Paul Heckey, Seattle, WA (US); Cody Aoan Wang, Seattle, WA (US); John Totah, Half Moon Bay, CA (US); Christopher Kasprowicz, Seattle, WA (US); William Vass, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 640 days.

(21) Appl. No.: 16/698,674

(22) Filed: Nov. 27, 2019

(65) Prior Publication Data

US 2021/0158199 A1    May 27, 2021

(51) Int. Cl.
*G06N 10/00* (2022.01)
*G06F 9/54* (2006.01)
(Continued)

(52) U.S. Cl.
CPC ......... *G06N 10/00* (2019.01); *G06F 9/45558* (2013.01); *G06F 9/54* (2013.01);
(Continued)

(58) Field of Classification Search
CPC .................. G06F 9/54; G06F 15/16; G06F 2009/45562; G06F 2009/45595; G06F 2009/45583; G06N 10/00; G06N 20/00
See application file for complete search history.

(56) References Cited

U.S. PATENT DOCUMENTS 6,741,585 B1   5/2004  Munoz et al.
7,277,872 B2  10/2007  Raussendorf et al.
(Continued)

FOREIGN PATENT DOCUMENTS

EP   1701259   9/2006
EP   2557498   2/2013
(Continued)

OTHER PUBLICATIONS

U.S. Appl. No. 17/525,723, filed Nov. 12, 2021, Milan Kmeta, et al.
(Continued)

*Primary Examiner* — Henry Tsai
*Assistant Examiner* — Christopher A Daley
(74) *Attorney, Agent, or Firm* — Alexander A. Knapp; Kowert, Hood, Munyon, Rankin & Goetzel, P.C.

(57) ABSTRACT

A quantum computing service includes connections to one or more quantum hardware providers that are configured to execute quantum circuits using quantum computers based on one or more quantum technologies. The quantum computing service also includes at least one edge computing device located adjacent to a quantum computer at one of the quantum hardware provider facilities. The edge computing device is configured to execute classical computing portions of a hybrid algorithm in coordination with the quantum computer, which executes quantum computing portions of the hybrid algorithm. Results of the execution of the hybrid algorithm are automatically stored to a data storage service accessible to the customer.

20 Claims, 23 Drawing Sheets

(51) Int. Cl.
  *G06F 9/455*    (2018.01)
  *G06F 15/16*    (2006.01)
(52) U.S. Cl.
  CPC .... *G06F 15/16* (2013.01); *G06F 2009/45583* (2013.01); *G06F 2009/45595* (2013.01)

(56) References Cited

U.S. PATENT DOCUMENTS

| | | | |
|---|---|---|---|
| 7,376,547 | B2 | 5/2008 | Meredith |
| 7,484,091 | B2 | 1/2009 | Bade et al. |
| 7,529,717 | B2 | 5/2009 | Vala et al. |
| 7,876,145 | B2 | 1/2011 | Koch |
| 7,996,836 | B1 | 8/2011 | McCorkendale et al. |
| 8,032,899 | B2 | 10/2011 | Archer et al. |
| 8,095,745 | B1* | 1/2012 | Schmidt ............ G06F 12/0207 711/154 |
| 8,127,292 | B1 | 2/2012 | Dobrovolskiy et al. |
| 8,190,553 | B2 | 5/2012 | Routt |
| 8,201,161 | B2 | 6/2012 | Challener et al. |
| 8,239,557 | B2 | 8/2012 | McCune et al. |
| 8,433,802 | B2 | 4/2013 | Head et al. |
| 8,514,868 | B2 | 8/2013 | Hill |
| 8,832,164 | B2 | 9/2014 | Mien et al. |
| 9,317,331 | B1 | 4/2016 | Koh et al. |
| 9,323,552 | B1 | 4/2016 | Adogla et al. |
| 9,361,145 | B1 | 6/2016 | Wilson et al. |
| 9,400,499 | B2 | 7/2016 | Williams et al. |
| 9,430,280 | B1 | 8/2016 | Shih et al. |
| 9,471,880 | B2 | 10/2016 | Williams |
| 9,485,323 | B1 | 11/2016 | Stickle et al. |
| 9,530,873 | B1 | 12/2016 | Carroll et al. |
| 9,537,953 | B1 | 1/2017 | Dadashikelayeh et al. |
| 9,660,859 | B1 | 5/2017 | Dadashikelayeh et al. |
| 9,870,273 | B2* | 1/2018 | Dadashikelayeh .... G06N 3/006 |
| 9,979,694 | B2 | 5/2018 | Brandwine et al. |
| 10,043,035 | B2 | 8/2018 | LaFever |
| 10,095,537 | B1 | 10/2018 | Neogy et al. |
| 10,275,721 | B2 | 4/2019 | Dukatz et al. |
| 10,482,413 | B2 | 11/2019 | Paterra et al. |
| 10,498,611 | B1 | 12/2019 | Kloberdans et al. |
| 10,592,216 | B1 | 3/2020 | Richardson et al. |
| 10,614,371 | B2 | 4/2020 | Bishop et al. |
| 10,817,337 | B1 | 10/2020 | Richardson |
| 10,997,519 | B2* | 5/2021 | Gunnels ................ G06F 9/5038 |
| 11,170,137 | B1 | 11/2021 | Richardson et al. |
| 11,222,279 | B2* | 1/2022 | Gambetta ............ G06N 10/00 |
| 11,270,220 | B1 | 3/2022 | Richardson et al. |
| 2003/0121028 | A1 | 6/2003 | Coury et al. |
| 2003/0169041 | A1 | 9/2003 | Coury et al. |
| 2005/0013280 | A1 | 1/2005 | Buddhikot et al. |
| 2005/0251806 | A1 | 11/2005 | Auslander et al. |
| 2006/0224547 | A1 | 10/2006 | Ulyanov et al. |
| 2006/0225165 | A1 | 10/2006 | Maassen van den Brink et al. |
| 2007/0174227 | A1 | 7/2007 | Johnson et al. |
| 2007/0239366 | A1 | 10/2007 | Hilton et al. |
| 2007/0294070 | A1 | 12/2007 | Yamashita |
| 2008/0244553 | A1 | 10/2008 | Cromer et al. |
| 2008/0313430 | A1 | 12/2008 | Bunyk |
| 2009/0070402 | A1 | 3/2009 | Rose et al. |
| 2010/0070970 | A1 | 3/2010 | Hu et al. |
| 2011/0075667 | A1 | 3/2011 | Li et al. |
| 2011/0131443 | A1 | 6/2011 | Laor et al. |
| 2013/0167123 | A1 | 6/2013 | Dura et al. |
| 2013/0179330 | A1* | 7/2013 | Quillian ............... G06Q 40/025 705/38 |
| 2014/0187427 | A1 | 7/2014 | Macready et al. |
| 2014/0208413 | A1 | 7/2014 | Grobman et al. |
| 2014/0264288 | A1 | 9/2014 | Svore et al. |
| 2015/0160884 | A1 | 6/2015 | Scales et al. |
| 2015/0339417 | A1 | 11/2015 | Garcia-Ramirez et al. |
| 2016/0026573 | A1 | 1/2016 | Jacobs et al. |
| 2016/0077845 | A1 | 3/2016 | Earl et al. |
| 2016/0170781 | A1 | 6/2016 | Liguori et al. |
| 2016/0170785 | A1 | 6/2016 | Liguori et al. |
| 2016/0328253 | A1 | 11/2016 | Majumdar |
| 2017/0017894 | A1 | 1/2017 | Lanting et al. |
| 2017/0177782 | A1 | 6/2017 | Hastings et al. |
| 2017/0194930 | A1 | 7/2017 | Wiebe et al. |
| 2017/0223094 | A1 | 8/2017 | Johnson et al. |
| 2017/0228483 | A1 | 8/2017 | Rigetti et al. |
| 2017/0286858 | A1 | 10/2017 | La Cour et al. |
| 2017/0300354 | A1 | 10/2017 | Dalal et al. |
| 2017/0357539 | A1 | 12/2017 | Dadashikelayeh et al. |
| 2017/0364796 | A1 | 12/2017 | Wiebe et al. |
| 2017/0366606 | A1 | 12/2017 | Ben-Shaul et al. |
| 2018/0046933 | A1 | 2/2018 | La Cour et al. |
| 2018/0107526 | A1* | 4/2018 | Dadashikelayeh ... H04L 67/565 |
| 2018/0107939 | A1 | 4/2018 | Schoennenbeck et al. |
| 2018/0232649 | A1 | 8/2018 | Wiebe et al. |
| 2018/0232653 | A1 | 8/2018 | Selvanayagam |
| 2018/0260125 | A1 | 9/2018 | Botes et al. |
| 2018/0260731 | A1 | 9/2018 | Zeng et al. |
| 2018/0307988 | A1 | 10/2018 | Fano et al. |
| 2018/0308000 | A1 | 10/2018 | Dukatz et al. |
| 2018/0365585 | A1 | 12/2018 | Smith et al. |
| 2018/0373540 | A1 | 12/2018 | Bao et al. |
| 2019/0222748 | A1* | 7/2019 | Weir .................... H04N 13/117 |
| 2019/0370679 | A1 | 12/2019 | Curtis |
| 2019/0378047 | A1* | 12/2019 | Pistoia .................. G06F 17/14 |
| 2020/0387822 | A1 | 12/2020 | Kilmov |
| 2021/0201189 | A1 | 7/2021 | Gunnels |
| 2021/0357797 | A1 | 11/2021 | Karalekas |
| 2021/0357799 | A1* | 11/2021 | Ducore ................. G06N 10/00 |

FOREIGN PATENT DOCUMENTS

| | | | |
|---|---|---|---|
| WO | 2015121619 | | 8/2015 |
| WO | 2019222748 A1 | | 11/2019 |
| WO | WO2019222748 | * | 11/2019 ............ G06N 10/00 |
| WO | 2020072819 | | 4/2020 |

OTHER PUBLICATIONS

U.S. Appl. No. 17/525,716, filed Nov. 12, 2021, Milan Kmeta, et al.
Ozgur Ulusoy, "Processing Real-Time Transactions in a Replicated Database System," 1994 Kluwer Academic Publishers, Boston, Revised Sep. 10, 1993, pp. 1-32.
Sergio Almeida, et al., "ChainReaction: a Casual+ Consistent Datastore based on Chain Replication," Eurosys'13 Apr. 15-17, 2013, Prague, Czech Republic, Copyright 2013 ACM 978-1-4503-1994-2/13/04, pp. 85-98.
Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.
Robbert van Renesse, et al, "Chain Replication for Supporting High Throughput and Availability," USENIX Association, OSDI 2004: 6th Symposium on Operating Systems Design and Implementation, pp. 91-104.
Philip A. Bernstein, et al, "Concurrency Control and Recovery in Database Systems," Addison-Wesley Publication Company, ISBN 0-201-10715-5, 1987, pp. 1-58.
From Wikipedia, the free encyclopedia, "Bromium," downloaded on Jun. 27, 2016 from https://en.wikipedia.org/wiki/Bromium, pp. 1-4.
Xen, "Dom0" downloaded Jun. 6, 2016 from http://wiki.xen.org/wiki/Dom0, last updated Mar. 29, 2015, pp. 1-2.
Amazon Web Services, "Amazon Elastic Compute Cloud: User Guide for Linux Instances," Latest Version update 2015, pp. 1-816.
IBM, General Information, Version 4, Release 3.0, Fifth Edition, Apr. 2002, pp. 1-101.
From Wikipedia, the free encyclopedia, "Hypervisor," downloaded Jun. 6, 2016 from https://en.wikipedia.org/wiki/Hypervisor, pp. 1-7.
Axel Buecker, et al., "Reduce Risk and Improve Security on IBM Mainframes: vol. 1 Architecture and Platform Security," Redbooks, IBM, Dec. 2014, pp. 1-308.
From Wikipedia, the free encyclopedia, "VMware ESX," downloaded Jun. 6, 2016 from https://en.wikipedia.org/wiki/VMware_ESX, pp. 1-13.
From Wikipedia, the free encyclopedia, "Xen," downloaded from Jun. 6, 2016 from https://en.wikipedia.org/wiki/Xen, pp. 1-12.

(56) References Cited

OTHER PUBLICATIONS

Udo Steinberg, et al., "NOVA: A Microhypervisor-Based Secure Virtualization Architecture", ACM, EuroSys'10, Apr. 13-16, 2010, pp. 209-222.
Sangster, et al., TCG Published, Virtualized Trusted Platform Architecture Specification, Specification Version 1.0, Revision 0.26, Sep. 27, 2011, pp. 1-60.
Network Functions Virtualization (NFV); NFV Security; Security and Trust Guidance, ETSI GS NFV-SEC 003, V1.1.2, downloaded by EP on Jun. 4, 2016, pp. 1-57.
Cong Xu, et al., "vSlicer: Latency-Aware Virtual Machine Scheduling via Differentiated-Frequency CPU Slicing", Purdue University, Purdue e-Pubs, 2012, pp. 1-14.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Announcing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.
Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.
U.S. Appl. No. 16/698,698, filed Nov. 27, 2019, Derek Bolt, et al.
U.S. Appl. No. 16/698,732, filed Nov. 27, 2019, Jeffrey Paul Heckey, et al.
U.S. Appl. No. 16/698,737, filed Nov. 27, 2019, Christopher Kasprowicz, et al.
U.S. Appl. No. 17/491,190, dated Sep. 30, 2021, Yunong, Shi.
Philipp Niemann, et al., "On the "Q" in QMDDs: Efficient Representation of Quantum Functionality in the QMDD Data-structure", Proceedings of the 5th International Conference on Reversible Computation, Jul. 2013, Source: http://.vww.informatik.uni-bremen.de/agra/doc/konf/13 rc eff_qmdd_representation.pdf, pp. 125-140.
Jeff Barr, "Developer Preview—EC2 Instances (F1) with Programmable Hardware", AWS Blog, Nov. 30, 2016, Source: hllps://aws.amazon.com/blogs/aws/developer-preview-ec2-instances-f1-with-programmable-hardware, pp. 1-9.
Jeff Barr, "EC2 Instance Type Update—T2, R4, F1, Elastic GPUs, I3, C5", AWS Blog, Nov. 30, 2016, Source: https://aws.amazon.com/blogs/aws/ec2-instance-type-update-t2-r4-f1-elastic-gpus-i3-c5/, pp. 1-6.

Sebastian Anthony, "Google's Quantum Computing Playground turns your PC into a quantum computer", Extremetech, May 2014, Source: https://www.extremetech.com/extreme/182913-googles-quantum-computing-playground-turns-your-pc-into-a-quantum-computer, pp. 1-3.
Jeff Barr, "In the Works—Amazon EC2 Elastic GPUs", Nov. 30, 2016, Source: https://aws.amazon.com/blogs/aws/in-the-work-amazon-ec2-elastic-gpus/, pp. 1-6.
Jeff Barr, "New—Amazon EC2 Instances with Up to 8 NVIDIA Tesla V100 GPUs (P3)", AWS Blog, Oct. 25, 2017, Source: https://aws.amazon.com/blogs/aws/new-amazon-ec2-instances-with-up-to-8-nvidia-tesla-v100-gpus-p3/, pp. 1-6.
Jarrod R. McClean, et al., "OpenFermion: The Electronic Structure Package for Quantum Computers", Oct. 20, 2017, Source: https://arxiv.org/abs/1710.07629, pp. 1-18.
Barbara Kessler, "The Evolution of Manged Services in Hyperscale Cloud Environments", AWS Partner Network Blog, Sep. 28, 2016, Source: https://aws.amazon.com/blogs/apn/the-evolution-of-managed-services-in-hyperscale-cloud-environments/, pp. 1-7.
Grodzinsky, F.S., et al., "Quantum Computing and Cloud Computing: Humans Trusting Humans via Machines," IEEE International Symposium on Technology and Society (ISTAS), 2011, 5 pages.
Zeiter, Daniel, "A graphical development environment for quantum algorithms", Master's Thesis, Sep. 3, 2008, 51 pages, Retrieved from the Internet (https://doi.org/10.3929/ethz-a-005675863).
Svore, K. M., et al., "A Layered Software Architecture for Quantum Computing Design Tools", Computer, IEEE Computer Society, Jan. 2006, pp. 74-83, vol. 39, Issue 1.
International Search Report and Written Opinion dated Mar. 19, 2021 in PCT/US2020/062176, Amazon Technologies, Inc.
U.S. Appl. No. 17/491,140, filed Sep. 30, 2021, Jeffrey Paul Heckey, et al.
Rahaman, et al., "A Review on Progress and Prodblems and Qualtum Coputing as a Servce (Qcaas) in the Perspective of Cloud Computering," Global Journal of Computer Science and Technology, 2015, 6pg.
Singh, et al., "The Quantum Way of Cloud Computing," IEEE, 2014, 4 pgs.
Igor L. Markov, et al., "Quantum Supremacy is Both Closer and Farther than It Appears", arXiv:1807.10749v3, Sep. 26, 2048. pp. 1-32.
U.S. Appl. No. 16/196,723, filed Nov. 20, 2018, Anthony Nicholas Liguori, et al.

\* cited by examiner

Example virtualization management software
components run at an edge computing device
1902

Embedded operating system
1904

Network interface card (NIC) emulators
1906

Legacy device emulators
1908

Block-device storage managers
(e.g., for configuring root volume of compute instance)
1910

NVME device emulators
1912

IVN data plane connectivity managers
(e.g., performing encapsulation protocol operations,
mapping service calls, etc.)
1914

Instance metadata service agents
1916

Cloud computing service control plane agents
1918

Network security agents
(e.g., DNS request loggers)
1920

QUANTUM COMPUTING SERVICE SUPPORTING LOCAL EXECUTION OF HYBRID ALGORITHMS

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g. the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g. a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

BRIEF DESCRIPTION OF THE DRAWINGS

FIG. 19 illustrates example virtualization management software components which may be executed at an edge computing device of a quantum computing service, located at a quantum hardware provider location, according to some embodiments.

Figure 1:
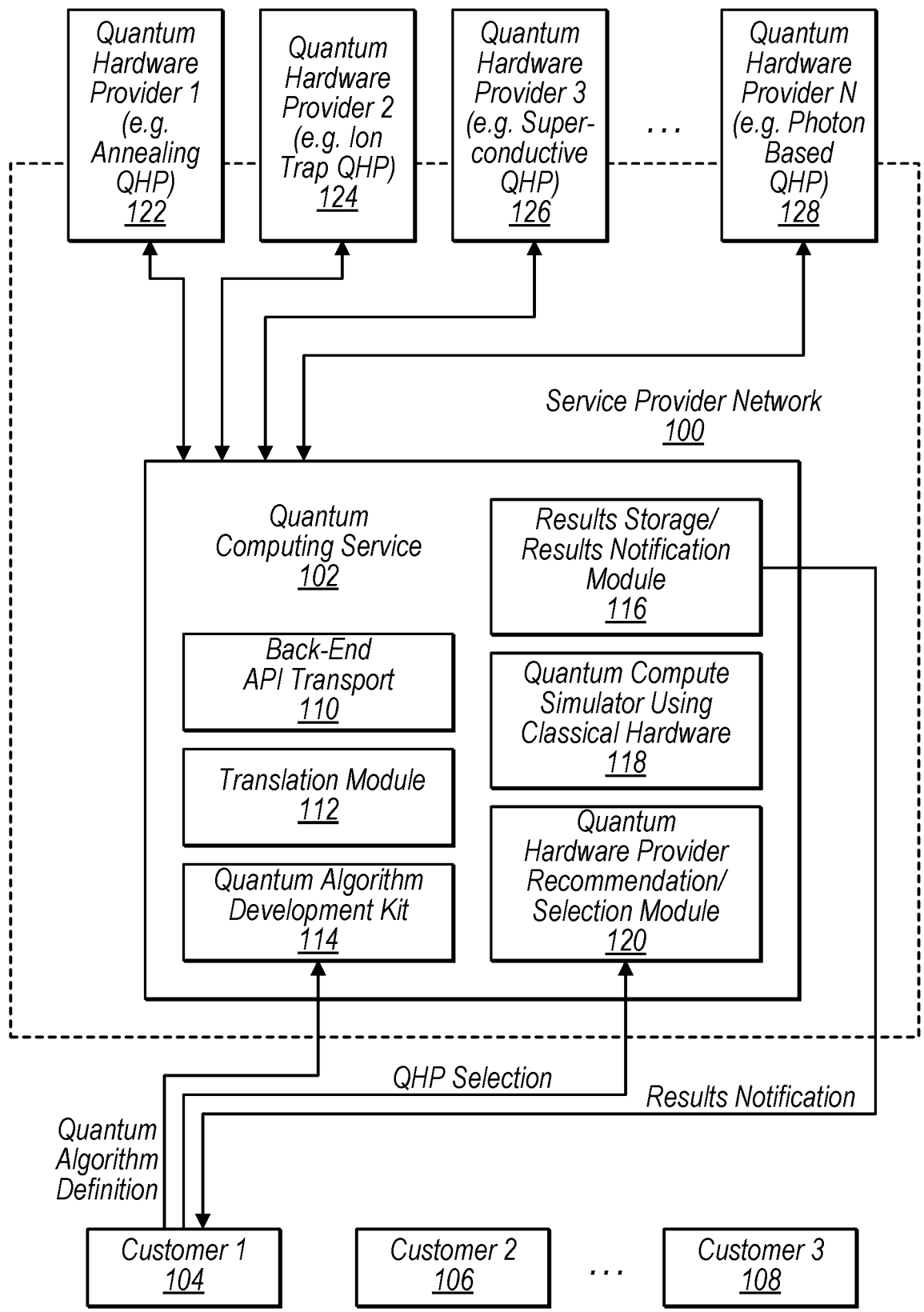
FIG. 1 illustrates a quantum computing service of a service provider network that enables customers to access quantum computers that use multiple quantum computing technologies, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for providing quantum computing services supporting multiple different quantum computing technologies to customers and enabling customers to seamlessly use the different quantum computing technologies without requiring the customers to have specific knowledge of the underlying quantum computing technologies.

In some embodiments, a system includes a service provider network comprising one or more computing devices that are configured to implement a quantum computing service. The system also includes a first edge computing device of the service provider network located at a location of a first quantum hardware provider and a second edge computing device of the service provider network located at a location of a second quantum hardware provider. The one or more computing devices that implement the quantum computing service are configured to receive, from a customer of the quantum computing service, a definition of a quantum computing object to be executed and select at least one of the first or second quantum hardware providers to execute the quantum computing object. In some embodiments, the quantum computing object may be a quantum task, such as a task defined using a problem-domain interface of a quantum algorithm development kit; a quantum algorithm defined using a quantum algorithm development kit of the quantum computing service or provided by a customer; or a quantum circuit defined using the quantum algorithm development kit of the quantum computing service, or supplied by a customer. In some embodiments, the one or more computing device that implement the quantum computing service may further be configured to provide the customer with a recommendation in regard to which quantum hardware provider to use to execute the customer's quantum computing object, and the selection of the first or second quantum hardware provider to execute the quantum computing object may be based on the recommendation and/or other input received from the customer regarding which quantum hardware provider to select to execute the customer's quantum computing object. In some embodiments, the recommendation may include estimated costs, error rates, run-time, etc. associated with executing the quantum computing object on quantum computers of respective ones of the quantum hardware providers.

The one or more computing devices implementing the quantum computing service are further configured to submit a quantum circuit corresponding to the quantum computing object to a selected one or more of the quantum hardware providers via the first or second edge computing device located at the respective locations of the selected one or more quantum hardware providers, receive results of executing the quantum circuit on a quantum computer of the selected one or more quantum hardware providers, store the results of executing the quantum circuit, and provide a notification to the customer that execution of the quantum computing object has been completed.

In some embodiments, a method includes receiving, at a quantum computing service implemented on one or more computing devices, from a customer of the quantum computing service, a definition of a quantum computing task to be performed. The method also includes selecting, by the quantum computing service, at least one of a first quantum hardware provider or a second quantum hardware provider to perform the quantum computing task, wherein the first quantum hardware provider and the second quantum hardware provider are configured to execute quantum computing tasks using quantum computers based on different quantum computing technologies. Additionally, the method includes submitting, by the quantum computing service, a quantum circuit corresponding to the quantum computing task to the selected at least one quantum hardware provider via a first edge computing device of the quantum computing service located at a location of the first quantum hardware provider or a second edge device of the quantum computing service located at a location of the second quantum hardware provider. Also, the method includes causing execution results received from the first or second quantum hardware provider to be stored and providing, by the quantum computing service, a notification to the customer that the quantum computing task has been completed.

In some embodiments, one or more non-transitory computer-readable media store program instructions, that when executed on or across one or more processors, cause the one or more processors to receive a definition of a quantum computing task to be performed and determine at least one of a first quantum hardware provider or a second quantum hardware provider to perform the quantum computing task, wherein the first quantum hardware provider and the second quantum hardware provider are configured to execute quantum computing tasks using quantum computers based on different quantum computing technologies. Additionally, the program instructions cause the one or more processors to submit the quantum computing task to the at least one quantum hardware provider via a first edge computing device of the quantum computing service located at a location of the first quantum hardware provider or a second edge device of the quantum computing service located at a location of the second quantum hardware provider and provide a notification when the quantum computing task has been completed.

In some embodiments, a system includes one or more computing devices of a service provider network that are configured to implement a quantum computing service configured to receive a quantum computing object defined in an intermediate representation. For example, the quantum computing object may be a quantum task, such as defined using a problem-domain interface of a quantum algorithm development kit; a quantum algorithm defined using a quantum algorithm development kit of the quantum computing service or provided by a customer; or a quantum circuit defined using the quantum algorithm development kit of the quantum computing service, or supplied by a customer. In some embodiments, the one or more computing devices that implement the quantum computing service may further be configured to provide the customer with a recommendation in regard to which quantum computing format to use to execute the customer's quantum computing object, and the selection of the quantum computing format to execute the quantum computing object may be based on the recommendation and/or other input received from the customer regarding which quantum computing format to select to execute the customer's quantum computing object. In some embodiments, the recommendation may include estimated costs, error rates, run-time, etc. associated with executing the quantum computing object on quantum computers of respective ones of the quantum hardware providers.

The quantum computing service is also configured to translate the quantum computing object into a selected quantum circuit format for a particular quantum computing technology, wherein the selected quantum circuit format for the particular quantum computing technology is one of a plurality of quantum circuit formats for a plurality of different quantum computing technologies supported by the quantum computing service.

To translate the quantum computing object into the selected quantum circuit format, the one or more computing devices that implement the quantum computing service are configured to identify portions of the quantum computing object corresponding to quantum operators in the intermediate representation, substitute the quantum operators of the intermediate representation with quantum operators of the quantum circuit format of the particular quantum computing technology, and perform one or more optimizations to reduce an overall number of quantum operators in a translated quantum circuit that is a translated version of the received quantum computing object.

Additionally, the quantum computing service is configured to provide the translated quantum circuit for execution at a quantum hardware provider that uses the particular quantum computing technology; receive, from the quantum hardware provider, results of the execution of the translated quantum circuit; and provide a notification to a customer of the quantum computing service that the quantum computing object has been executed.

In some embodiments, a method includes receiving, at a quantum computing service implemented on one or more computing devices, a quantum computing object defined in an intermediate representation and translating, by the quantum computing service, the quantum computing object into a format for a particular quantum computing technology, wherein the format for the particular quantum computing technology is one of a plurality of formats for a plurality of different quantum computing technologies supported by the quantum computing service. Translating the quantum computing object into the format for the particular quantum computing technology comprises identifying portions of the quantum computing object corresponding to quantum operators in the intermediate representation and substituting the quantum operators of the intermediate representation with quantum operators of the format for the particular quantum computing technology. Also, translating the quantum computing object into the format for the particular quantum computing technology may comprise performing one or more optimizations to reduce an overall number of quantum operators included in a translated quantum circuit that is a translated version of the received quantum computing object.

In some embodiments, one or more non-transitory computer-readable media store program instructions, that when executed on or across one or more processors, cause the one or more processors to receive a quantum computing object defined in an intermediate representation and translate the quantum computing object into a format for a particular quantum computing technology, wherein the format for the particular quantum computing technology is one of a plurality of supported formats for a plurality of different quantum computing technologies. To translate the quantum computing object into the format for the particular quantum computing technology, the one or program instructions, when executed one or across the one or more processors, cause the one or more processors to identify portions of the quantum computing object corresponding to quantum operators in the intermediate representation; substitute the quantum operators of the intermediate representation with quantum operators of the quantum format of the particular quantum computing technology; and perform one or more optimizations to reduce an overall number of quantum operators in a translated quantum circuit that is a translated version of the quantum computing object.

In some embodiments, a quantum operator included in a quantum object may correspond with a quantum gate. Also, in some embodiments, optimization reduce an overall number of quantum operators may include reducing an overall number of quantum gates included in the translated quantum circuit. In some embodiments, a quantum operator included in a quantum circuit may be an operator used to program other types of quantum computing systems, such as a quantum annealer.

In some embodiments, a system includes one or more computing devices of a service provider network configured to implement a quantum computing service. The system also includes a first edge computing device of the service provider network located at a location of a first quantum hardware provider and a second edge computing device of the service provider network located at a location of a second quantum hardware provider. The first quantum hardware provider and the second quantum hardware provider are configured to execute quantum computing circuits using quantum computers based on different quantum computing technologies. Additionally, the first and second edge computing devices are each configured to instantiate a virtual machine implemented on classical computing hardware of the respective first or second edge computing device and receive, via the quantum computing service, a hybrid quantum computing algorithm comprising classical computing portions and quantum computing portions.

Additionally, the first and second edge computing devices are each configured to execute the classical computing portions on the virtual machine implemented on the classical computing hardware of the respective first or second edge computing device and coordinate execution of the quantum computing portions on a quantum computer at the respective first or second quantum hardware provider location where the respective first or second edge computing device is located. For example, in some embodiments, the first and second edge computing devices are each configured to instantiate at least one virtual machine to manage coordinating execution of the quantum computing portions of the hybrid quantum computing algorithm and also instantiate one or more virtual machine to execute the classical computing portions of the hybrid quantum computing algorithm. Wherein the classical portions are executed locally at the quantum hardware provider such that there is minimal latency between the classical computer of the virtual machine implemented on the edge computing device and the quantum computer at the quantum hardware provider.

Also, the first and second edge computing devices are each configured to submit results generated from executing the hybrid quantum computing algorithm to a data storage system of the service provider network, wherein one or more computing devices implementing the data storage system are located at a facility of the service provider network remote from the location of the respective first or second quantum hardware provider.

In some embodiments, an edge computing device includes a first network connector configured to couple with a local network of a quantum hardware provider, a second network connector configured to connect to a quantum computing service, and classical computing hardware. The classical computing hardware includes one or more processors and a memory storing program instructions, that when executed on or across the one or more processors, cause the one or more processors to instantiate a virtual machine implemented on the classical computing hardware of the edge computing device; and receive, from a quantum computing service via the second connector, a hybrid quantum computing algorithm comprising classical computing portions and quantum computing portions. The program instructions further cause the one or more processors to execute the classical computing portions on the virtual machine implemented on the classical computing hardware of the edge computing device; coordinate, via the first connector coupled to the local network of the quantum hardware provider, execution of the quantum computing portions on a quantum computer at a location of the quantum hardware provider where the edge computing device is located; and submit, via the second connector, results generated from executing the hybrid quantum computing algorithm to a data storage system of a service provider network that includes the quantum computing service, wherein one or more computing devices implementing the data storage system are located at a facility of the service provider network remote from the location of the quantum hardware provider.

In some embodiments, a method includes instantiating a virtual machine implemented on classical computing hardware of an edge computing device located at a quantum hardware provider location and connected to a quantum computing service implemented via one or more computing devices at a location remote from the quantum hardware provider location and receiving, via the quantum computing service, a hybrid quantum computing algorithm comprising classical computing portions and quantum computing portions. The method further includes executing the classical computing portions on the virtual machine implemented on the classical computing hardware of the edge computing device located at the quantum hardware provider location; coordinating execution of the quantum computing portions on a quantum computer at the quantum hardware provider location; and submitting results generated from executing the hybrid quantum computing algorithm to a data storage system, wherein one or more computing devices implementing the data storage system are located remote from the quantum hardware provider location.

In some embodiments, a system includes one or more computing devices of a service provider network configured to implement a quantum computing service. The system also includes a first edge computing device of the service provider network located at a location of a first quantum hardware provider and a second edge computing device of the service provider network located at a location of a second quantum hardware provider, wherein the first quantum hardware provider and the second quantum hardware provider are configured to execute quantum computing circuits using quantum computers based on different quantum computing technologies. The first and second edge computing devices are each configured to receive one or more quantum computing circuits to be executed on a quantum computer at the first or second hardware provider location, schedule availability on the quantum computer for executing the one or more quantum computing circuits, store the one or more quantum computing circuits in a local queue of the first or second edge computing device, and submit the one or more quantum computing circuits to the quantum computer at the first or second quantum hardware provider location for execution during the scheduled availability.

In some embodiments, an edge computing device includes a first network connector configured to couple with a local network of a quantum hardware provider and a second network connector configured to connect the edge computing device to a quantum computing service. The edge computing device also includes one or more processors and a memory storing program instructions, that when executed on or across the one or more processors, cause the one or more processors to receive one or more quantum computing circuits to be executed on a quantum computer at a location of the quantum hardware provider where the edge computing device is located; schedule availability on the quantum computer for executing the one or more quantum computing circuits; store the one or more quantum computing circuits in a local queue pending the availability; and submit the one or more quantum computing circuits to the quantum computer at the location of the quantum hardware provider for execution during the scheduled availability.

In some embodiments, one or more non-transitory computer-readable media store program instructions, that when executed on or across one or more processors, cause the one or more processors to receive, from a quantum computing service, one or more quantum computing circuits to be executed on a quantum computer at quantum hardware provider location, wherein the quantum hardware provider location is remote from one or more computers that implement the quantum computing service; coordinate scheduling availability on the quantum computer for executing the one or more quantum computing circuits; cause the one or more quantum computing circuits to be stored in a local queue pending the availability; and submit the one or more quantum computing circuits to the quantum computer at the quantum hardware provider location for execution during the scheduled availability.

In some embodiments, an edge computing device of a quantum computing service located at a quantum hardware provider location may include a virtualization offloading component that manages compute instances (e.g. virtual machines) instantiated on the edge computing device. In some embodiments, a virtualization offloading component of an edge computing device located at a quantum hardware provider location may provide a compute instance instantiated on the edge computing device access to a quantum machine image stored in a block-based storage service of the service provider network for use in booting the compute instance (e.g. virtual machine) on the edge computing device. Also, the virtualization offloading component may provide another compute instance instantiated on the edge computing device access to a hybrid compute machine image stored in the block-based storage service. In some embodiments, the virtualization offloading component may provide yet a third compute instance access to a customer selected machine image stored in the block-based storage service. Alternatively in some embodiments, the machine images, such as the quantum machine image and the hybrid compute machine image may be stored in a local persistent store of the edge computing device located at the quantum hardware provider location.

Also, in some embodiments, the virtualization offloading component of the edge computing device may manage network traffic between a compute instance instantiated on the edge computing device and other instances or services of the service provider network. For example, the virtualization offloading component may route packets to or from the compute instance over a substrate network of the virtualized computing service and may perform encapsulation or address re-direction of the packets. Additionally, the virtualization offloading component may manage security for a compute instance instantiated on the edge computing device. For example, the virtualization offloading component may encrypt and decrypt incoming and outgoing traffic and may manage security keys for the compute instance instantiated on the edge computing device. Additionally, the virtualization offloading component may manage traffic such that a given compute instance instantiated on the edge computing device is included in an isolated virtual network, e.g. a virtual private cloud, and may manage address translation between private and/or public addresses for the compute instance. In some embodiments, these virtualization tasks may be performed on processors or cores of the virtualization offloading component that are separate from other hardware of the edge computing device, but that are included in the same chassis with the edge computing device.

In some embodiments, a virtualized computing service may be among a plurality of network-accessible services (e.g., including storage services, database services, etc.) implemented at a service provider network or in a cloud computing environment.

In some embodiments, the virtualization offloading components of the edge computing devices may include various elements of hardware (e.g., including processors/cores, memories, storage devices, circuitry for power management, security management and the like) and software that collectively implement network and storage virtualization management, provide access to storage volumes via block-device interfaces, and incorporate the compute instances instantiated on the edge computing device within isolated virtual networks (IVNs) or other logical networks set up for the customer at the virtualized computing service.

In various embodiments, a virtualized computing service may comprise a physical network, referred to as a substrate network, to which hardware servers at a service provider data center and edge computing devices at a quantum hardware provider location, as well as various other devices (such as networking intermediary devices including routers, switches, gateways and the like) may be connected. Utilizing the substrate network as underlying infrastructure, logical networks may be configured in such embodiments on behalf of various virtualized computing service customers. For example, a set of compute instances (including virtual machines, bare-metal instances that allow un-virtualized access to at least some hardware components of the underlying servers, etc.) may be configured on behalf of customer C1 within a logical network called an isolated virtual network IVN1 (also referred to herein a virtual private cloud or VPC), while another set of compute instances may be configured on behalf of a different customer C2 within another isolated virtual network IVN2.

An isolated virtual network (IVN) or virtual private cloud (VPC) may comprise a collection of networked resources (including compute instances) assigned or allocated to a given customer, which are logically isolated from (and by default, inaccessible from) resources allocated for other customers in other isolated virtual networks or other virtual private clouds. The customer on whose behalf an IVN (or VPC) is established may be granted substantial flexibility regarding network configuration for the resources of the IVN (or VPC)—e.g., private IP addresses for compute instances may be selected by the customer without having to consider the possibility that other resources within other IVNs (or VPCs) may have been assigned the same IP addresses, subnets of the customer's choice may be established within the IVN (or VPC), security rules may be set up by the customer for incoming and outgoing traffic with respect to the IVN (or VPC), and so on.

Furthermore, in at least some embodiments, custom network endpoints may be set up within IVNs (or VPCs) to enable compute instances of the IVN (or VPC) to communicate with network-accessible services of the service provider network (such as storage services, database services, machine learning services, etc.) using private network pathways of the provider network, without having to traverse or use links or devices of the public Internet. In various embodiments, the network addresses assigned to compute instances within an IVN (or VPC) may differ from the substrate network addresses assigned to the hardware servers on which the compute instances run. An encapsulation protocol and associated mapping service may be used to route the flows of network traffic within and across the IVNs (or VPCs) (e.g., from one compute instance to another, between client devices external to the virtualized computing service and the compute instances, or between compute instances and other provider network services) over the links and servers of the underlying substrate network in various embodiments. The virtualized computing service may also comprise a set of administrative or data plane components in various embodiments, responsible for tasks such as provisioning hardware, monitoring other resources, receiving and processing instance configuration commands from customers, and so on.

The virtualization offloading component of an edge computing device at a quantum hardware provider location may initiate one or more configuration operations of a compute instance on behalf of the customer in various embodiments, including for example launching the compute instance, changing networking or other configuration settings, terminating the instance, and so on. In at least one embodiment, a bare metal compute instance may be instantiated on an edge computing device on behalf of the customer via a virtualization offloading component included in the edge computing device, enabling un-virtualized access to at least some of the edge computing device's hardware devices/components. In various embodiments, a compute instance implemented on an edge computing device may be configured within an isolated virtual network of the service provider network based at least in part on operations performed using the one or more networking managers running at a virtualization offloading component included in the edge computing device. Such networking managers may, for example, store an indication of a network address (within a range of private network addresses of an isolated virtual network established at the virtualized computing service) which has been assigned to a compute instance configured at the edge computing device, and/or may assign such an address to a virtual network interface programmatically attached to such a compute instance.

In some embodiments, a compute instance of an edge computing device may be provided access to a root volume (and/or other logical storage devices, file systems, and the like) based at least in part on operations performed by the one or more storage managers running at the virtualization offloading component included in the edge computing device. For example, in some embodiments the storage managers may set up, modify, or otherwise configure the root volume using a block-storage service of the service provider network, and/or other logical storage devices, file systems and the like. In some embodiments, the virtualization offloading component may comprise one or more persistent storage devices (e.g., devices accessible via an NVME (non-volatile memory express) interface) at which the contents of the root volume and/or other storage objects accessed from the compute instances of the edge computing device may be stored. Additionally, or alternatively, the virtualization offloading component may be connected, for example, via a SATA cable connection, to one or more solid-state drives included in the edge computing device at which the contents of the root volume and/or other storage objects accessed from the compute instances of the edge computing device may be stored.

According to at least one embodiment, the networking managers of the virtualization offloading component may include a network interface card (NIC) emulator and/or an IVN connectivity manager. Encapsulation/de-capsulation operations of the encapsulation protocol of the virtualized computing service may be implemented at the networking managers in some embodiments, e.g., for packets directed from a data center compute instance within a particular IVN to an edge computing device compute instance running at the same IVN or a different IVN. In at least one embodiment, the networking managers of the virtualization offloading component may be configured to log various types of network traffic directed to and/or from the compute instance(s), e.g., including Domain Name Service traffic directed to DNS servers in or outside the provider network, and provide such logs via programmatic interfaces to the customer on whose behalf the compute instance is configured.

A number of programmatic interfaces (e.g., web-based consoles, command-line tools, graphical user interfaces, application programming interfaces (APIs) and the like) may be implemented by the virtualized computing service to enable customers to submit requests pertaining to compute instances in various embodiments and receive corresponding responses. For example, a customer may submit a programmatic request to instantiate a compute instance on an edge computing device located at a quantum hardware provider. In some embodiments, a virtualized computing service may dynamically increase or decrease provisioned compute instances that execute in an edge computing device at a quantum hardware provider location. For example, a customer may request more or fewer instances via a command-line tool or graphical user interface and the virtualized computing service may dynamically add or remove compute instances from the customer's pool of allocated resources. Also, a customer may dynamically add or remove compute instances that execute in at an edge computing device at a quantum hardware provider location to or from isolated virtual networks or VPCs allocated to the customer.

In some embodiments, the server chassis of an edge computing device may include a persistent storage device and the virtualization offloading component may comprise an associated cryptographic storage security device (such as a physical key). A removal of the cryptographic storage security device may render the contents of the persistent storage device unreadable/un-writeable in such an embodiment—that is, the security device may have to be physically present to allow the contents of the persistent storage device to be read or written.

According to at least one embodiment, the virtualization offloading component may comprise one or more small form factor pluggable (SFP) ports. Such ports may be used to establish connectivity with the virtualized computing service substrate network and/or other networks.

According to some embodiments, as mentioned earlier, the provider network of the virtualized computing service may implement one or more other services, such as a database service or an object storage service, which can be accessed from at least some compute instances of the virtualized computing service executing in a quantum hardware provider location using credentials assigned to the compute instances by an instance metadata service (IMDS) of the virtualized computing service. Such an IMDS may also provide other metadata elements to compute instances executing in a quantum hardware provider location, including a unique identifier assigned by the virtualized computing service to the compute instance, an identifier of a machine image used for the compute instance (if any), block device mappings information of the instance, and so on. In some embodiments, the metadata may be accessed from the compute instance executing in the quantum hardware provider location via a link-local HTTP (HyperText Transfer Protocol) address accessible only from within the instance itself. In at least one embodiment, an agent of the IMDS may be run at a virtualization offloading component, and such metadata (including the credentials usable to access other provider network services from the compute instance) may be provided by the agent.

In some embodiments, as mentioned earlier, private service endpoints (PSEs) may be set up within an IVN, e.g., to enable network traffic to flow between compute instances of the IVN and other publicly-accessible service provider network services without using the public Internet. In at least one such embodiments, customers may define and associate various types of policies with such PSEs—e.g., a policy may indicate that only instances CI1, CI2 and CI3 of an IVN are permitted to use an endpoint PSE1 to access a particular storage object SO1 at a storage service SS1. Compute instances set up at quantum hardware provider locations included in an edge computing device with a virtualization offloading component may utilize such PSEs and associated policies in at least some embodiments.

In some embodiments, a virtualization offloading component used to manage compute instances on an edge computing device at a quantum hardware provider location may provide the same elasticity, scalability, reliability, and security that is offered to customers using data center based compute instances. Also, a virtualization offloading component used to manage compute instances on an edge computing device at a quantum hardware provider location may provide seamless access to other services of a service provider network of the virtualized computing service, such as a virtual private cloud service (VPC or IVN), an elastic-block storage service (EBS), a load balancing service (LBS), object-based storage system, etc.

Example Quantum Computing Service

Quantum computers may be difficult and costly to construct and operate. Also, there are varying quantum computing technologies under development with no clear trend as to which of the developing quantum computing technologies may gain prominence. Thus, potential users of quantum computers may be hesitant to invest in building or acquiring a particular type of quantum computer, as other quantum computing technologies may eclipse a selected quantum computing technology that a potential quantum computer user may invest in. Also, successfully using quantum computers to solve practical problems may require significant trial and error and/or otherwise require significant expertise in using quantum computers.

As an alternative to building and maintaining a quantum computer, potential users of quantum computers may instead prefer to rely on a quantum computing service to provide access to quantum computers. Also, in some embodiments, a quantum computing service, as described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator. Also, in some embodiments, a quantum computing service may maintain one or more "warm" simulators. The "warm" simulators may include simulators that are pre-configured on compute instances of a virtualized computing service and are already instantiated such that the simulators are ready to perform simulation on behalf of quantum computing service customers on demand.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:
  (Create/Delete/Update/Get/List)Simulator-Configuration—create, read, update, and delete (CRUD) operations for simulator configuration objects.
  (Start/Cancel/Describe)Simulator—used to control each of the user-defined simulator instances.
  (List/Describe) quantum processor units (QPUs)—retrieves quantum computer hardware information.
  (Create/Cancel/List/Describe)Task—used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit. In the some embodiments, the quantum algorithm development kit may include an interface option that enables customers to share the quantum objects with other customers of the quantum computing service. For example, the quantum algorithm development kit may include a marketplace that allows customers to share or sell particular quantum objects with other customers.

In some embodiments, a quantum computing service may include a public application programmatic interface (API) that accepts quantum objects submitted by a customer of the quantum computing service. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology based quantum computers. Based on the results, the machine learning service may determine one or more optimizations to improve the quantum algorithms or quantum circuits.

In some embodiments, a quantum computing service may support creating snapshots of results of executing a quantum circuit. For example, the quantum computing service may store snapshots of intermediate results of a hybrid algorithm or may more generally store snapshots of any results generated by executing a quantum circuit on a quantum computer. In some embodiments, an edge computing device at a hardware provider location may temporarily store results and may create snapshot copies of results stored on the edge computing device. The edge computing device may further cause the snapshot copies to be stored in an object-based data storage service of the service provider network. In some embodiments, snapshotting may not be performed, based on customer preferences.

FIG. 1 illustrates a quantum computing service of a service provider network that enables customers to access quantum computers that use multiple quantum computing technologies, according to some embodiments.

Service provider network 100 includes quantum computing service 102. In some embodiments, service provider network 100 may include data centers, routers, networking devices, etc., such as of a cloud computing provider network. In some embodiments, customers 104, 106, and 108 and/or additional customers of service provider network 100 and/or quantum computing service 102, may be connected to the service provider network 100 in various ways, such as via a logically isolated connection over a public network, via a dedicated private physical connection, not accessible to the public, via a public Internet connection, etc.

In some embodiments, a quantum computing service 102 may include a quantum algorithm development kit 114, such as described in more detail in FIGS. 4-9. Also, quantum computing service 102 may include a translation module 112 as described in more detail in FIGS. 10-12.

Also, quantum computing service 102 is connected to quantum hardware providers 122, 124, 126, and 128. In some embodiments, quantum hardware providers 122, 124, 126, and 128 may offer access to run quantum objects on quantum computers that operate based on various different types of quantum computing technologies or paradigms, such as based on quantum annealing, ion-trap, superconductive materials, photons, etc.

Figure 2:
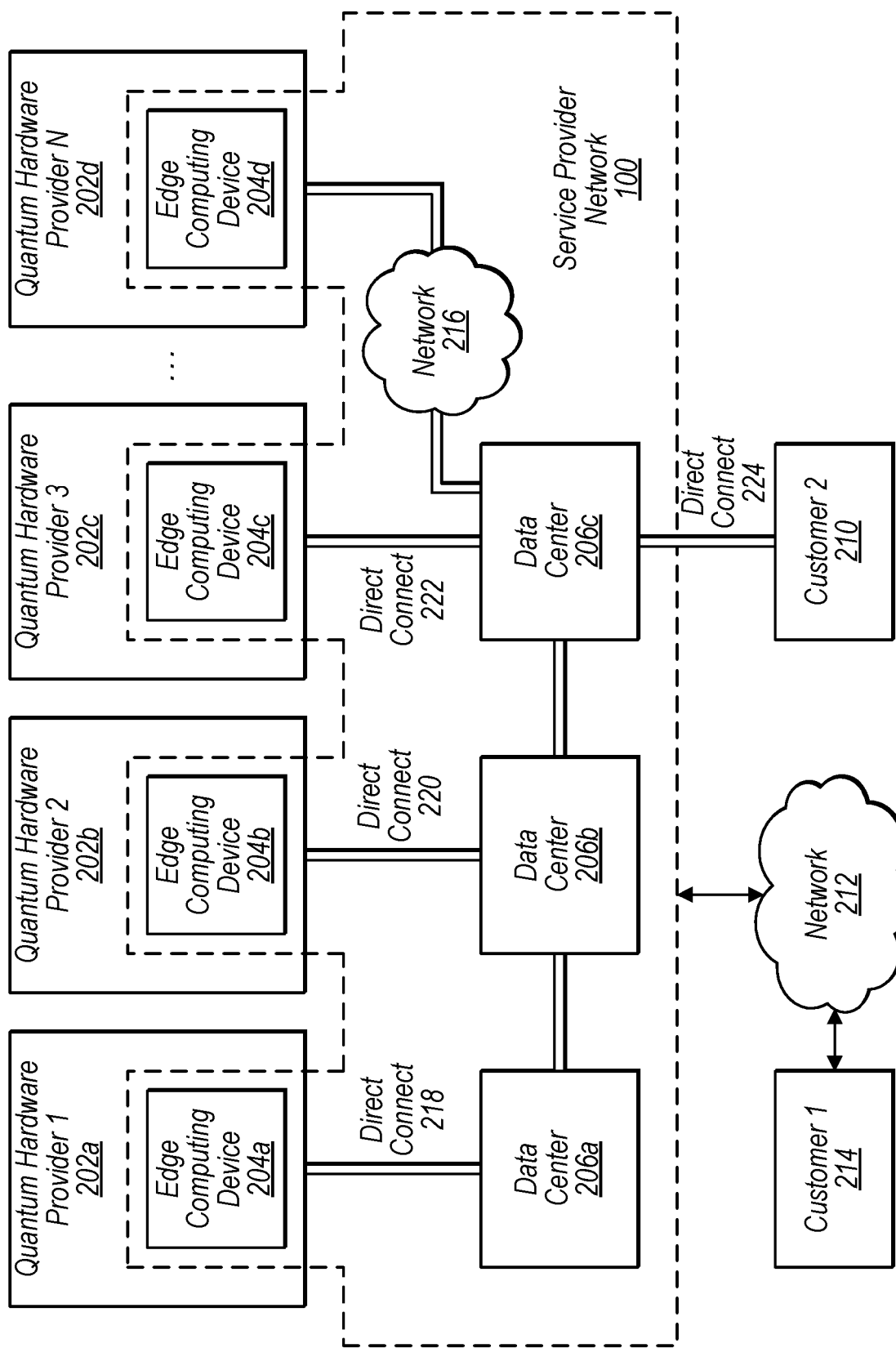
FIG. 2 illustrates edge computing devices of a quantum computing service physically located at quantum hardware provider locations, according to some embodiments.

As discussed in more detail in FIG. 2, in some embodiments, a service provider network 100 may be extended to include one or more edge computing devices physically located at quantum hardware provider locations, such as in a facility of quantum hardware providers 122, 124, 126, and 128. Physically locating an edge computing device of a service provider network 100 on premises at a quantum hardware provider facility may extend data security and encryption of the service provider network 100 into the quantum hardware providers 122, 124, 126, and 128 facilities, thus ensuring the security of customer data. Also, physically locating an edge computing device of a service provider network 100 on premises at a quantum hardware provider facility may reduce latency between a compute instance of the service provider network and a quantum computer located at the quantum hardware provider facility. Thus, some applications, such as hybrid algorithms that are sensitive to network latencies may be performed by quantum computing service 102, whereas other systems without co-located classical compute capacity at a hardware provider location may have too high of latencies to perform such hybrid algorithms efficiently.

In some embodiments, quantum computing service 102 includes a back-end API transport module 110. In some embodiments, the back-end API transport module 110 may be primarily implemented on edge computing devices of the quantum computing service that are located at the quantum hardware provider locations (such as edge computing devices 204a, 204b, 204c, and 204d illustrated in FIG. 2). Also, in some embodiments, at least some of the back-end API transport functionality may be implemented on the one or more computing devices of the service provider network that implement the quantum computing service (such as computing devices in data center 206a, 206b, 206c illustrated in FIG. 2).

Quantum circuits that have been translated by translation module 112 may be provided to back-end API transport module 110 in order for the translated quantum circuits to be transported to a quantum computer at a respective quantum hardware provider location. In some embodiments, back-end API transport 110 may be a non-public API that is accessible by an edge computing device of service provider network 100, but that is not publicly available. In some embodiments, edge computing devices at the quantum hardware providers 122, 124, 126, and 128 may periodically ping a quantum computer service side interface to the back-end API transport 110 to determine if there are any quantum circuits waiting to be transported to the edge computing device. If so, the edge computing device may perform an API call to the back-end API transport 110 to cause the quantum circuit to be transported over a private connection to the edge computing device and scheduled for execution on a quantum computer. As discussed in more detail in FIGS. 17-18, the edge computing device may queue the quantum circuit for execution on a quantum computer of the quantum hardware provider where the edge computing device is located. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 110.

In some embodiments, results of executing the quantum circuit on the quantum computer at the quantum hardware provider location may be returned to the edge computing device at the quantum hardware provider location. The edge computing device and/or quantum computing service 102 may cause the results to be stored in a data storage system of the service provider network 100, as discussed in more detail in FIG. 3. In some embodiments, results storage/results notification module 116 may coordinate storing results and may notify a customer, such as customer 104, that the results are ready from the execution of the customer's quantum object, such as a quantum task, quantum algorithm, or quantum circuit. In some embodiments, results storage/results notification module 116 may cause storage space in a data storage service to be allocated to a customer to store the customer's results. Also, the results storage/results notification module 116 may specify access restrictions for viewing the customer's results in accordance with customer preferences.

In some embodiments, quantum compute simulator using classical hardware 118 of quantum computing service 102, may be used to simulate a quantum algorithm or quantum circuit using classical hardware. For example, one or more virtual machines of a virtual computing service, such as virtual computing service 326 illustrated in FIG. 3, may be instantiated to process a quantum algorithm or quantum circuit simulation job. In some embodiments, quantum compute simulator using classical hardware 118 may fully manage compute instances that perform quantum circuit simulation. For example, in some embodiments, a customer may submit a quantum circuit to be simulated and quantum compute simulator using classical hardware 118 may determine resources needed to perform the simulation job, reserve the resources, configure the resources, etc. In some embodiments, quantum compute simulator using classical hardware 118 may include one or more "warm" simulators that are pre-configured simulators such that they are ready to perform a simulation job without a delay typically involved in reserving resources and configuring the resources to perform simulation.

In some embodiments, quantum computing service 102 includes quantum hardware provider recommendation/selection module 120. In some embodiments, quantum hardware recommendation/selection module 120 may make a recommendation to a quantum computing service customer as to which type of quantum computer or which quantum hardware provider to use to execute a quantum object submitted by the customer. Additionally, or alternatively, the quantum hardware provider recommendation/selection module 120 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 120 may be based on one or more characteristics of a quantum object submitted by a customer and one or more characteristics of the quantum hardware providers supported by the quantum computing service 102, such as one or more of quantum hardware providers 122, 124, 126, or 128.

In some embodiments, quantum hardware provider recommendation/selection module may make a recommendation based on known data about previously executed quantum objects similar to the quantum object submitted by the customer. For example, quantum computing service 102 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 118, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

FIG. 2 illustrates edge computing devices of a quantum computing service physically located at quantum hardware provider locations, according to some embodiments.

In some embodiments, service provider network 100, as illustrated in FIGS. 1, 2, 3, 13, and 20, may include one or more data centers connected to each other via private or public network connections. Also, edge computing devices located at quantum hardware provider locations may be connected to a service provider network via private or public network connections. For example, service provider network 100 illustrated in FIG. 2 includes data centers 206a, 206b, and 206c that are connected to one another via private physical network links of the service provider network 100. In some embodiments, a customer of the service provider network may also be connected via a private physical network link that is not available to the public to carry network traffic, such as a physical connection at a router co-location facility. For example, customer 210 is connected to a router associated with data center 206c via direct connection 224. In a similar manner, edge computing devices located at quantum hardware provider locations may be connected to a service provider network via a private physical network link that is not available to carry public network traffic.

For example, edge computing device 204a located at quantum hardware provider location 202a is connected to a router at data center 206a via direct connection 218. In a similar manner, edge computing device 204b at quantum hardware provider location 202b is connected to a router at data center 206b via direct connection 220. Also, edge computing device 204c at quantum hardware provider 202c is connected to a router at data center 206c via direct connection 222.

Also, in some embodiments an edge computing device of a service provider network located at a quantum hardware provider location may be connected to the service provider network via a logically isolated network connection over a shared network connection, such as via the Internet or another public network. For example, edge computing device 204d at quantum hardware provider location 202d is connected to data center 206c via a logically isolated network connection via network 216. In a similar manner, in some embodiments a customer, such as customer 214, may be connected to service provider network 100 via public network 212.

In some embodiments, a quantum computing service such as quantum computing service 102, may be implemented using one or more computing devices in any of data centers 206a, 206b, 206c, etc. Also the quantum computing service 102, may provide customers, such as customer 214 or customer 210, access to quantum computers in any of quantum hardware provider locations 202a, 202b, 202c, 202d, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology based quantum computers.

Figure 3:
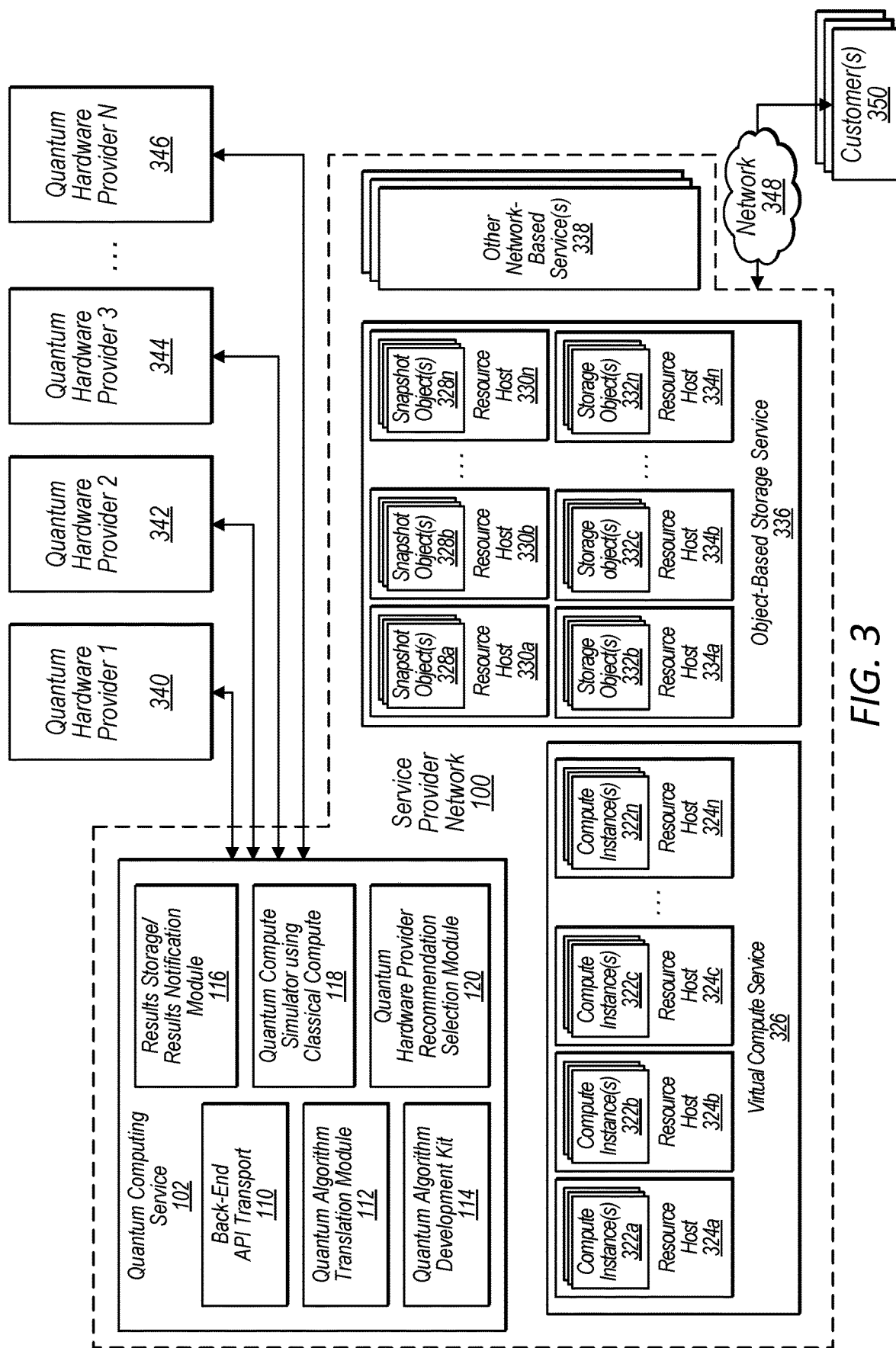
FIG. 3 illustrates a service provider network comprising a quantum computing service, virtual computing service, and storage service, according to some embodiments.

FIG. 3 illustrates a service provider network comprising a quantum computing service, virtual computing service, and storage service, according to some embodiments.

Service provider network 100 as illustrated in FIGS. 1, 2, 3, 13, and 20 may be set up by an entity such as a company or a public sector organization to provide one or more services (such as various types of cloud-based computing or storage) accessible via the Internet and/or other networks to customers 350. Service provider network 100 may include numerous data centers (such as the data centers and network spines described in regard to FIG. 2) hosting various pools of resource hosts, such as collections of physical and/or virtualized computer servers, storage devices, networking equipment and the like (e.g., computing system 2300 described below with regard to FIG. 23), needed to implement and distribute the infrastructure and services offered by the service provider network 100. In some embodiments, service provider network 100 may provide computing resources, such as virtual compute service 326, storage services, such as object-based storage service 336 (which may include various storage types such as object/key-value based data stores or various types of database systems), and/or any other type of network-based services 338. Customers 350 may access these various services offered by provider network 100 via network 348. Likewise network-based services may themselves communicate and/or make use of one another to provide different services. For example, computing resources offered to customers 350 in units called "instances," such as virtual or physical compute instances or storage instances, may make use of other resources, such as data stored in object based data storage service 336 for the compute instances 322a, 322b, 322c and 322c.

As noted above, virtual compute service 326 may offer various compute instances to customers 350. In some embodiments, such compute instances may be instantiated on an edge computing device located at a quantum hardware provider location. For example, in some embodiments, one or more of resource hosts 324a, 324b, 324c, or 324n may be an edge computing device located at a quantum hardware provider location, such as a location of quantum hardware providers 340, 342, 344, and/or 346. Additionally, a virtual compute instance (e.g. virtual machine) may, for example, be implemented on one or more resource hosts 324 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 326 in different embodiments, including special purpose computer servers, storage devices, network devices and the like, such as edge computing devices located at a quantum hardware provider location. In some embodiments instance customers 350 or any other user may be configured (and/or authorized) to direct network traffic to a compute instance. In various embodiments, compute instances may attach or map to one or more data volumes provided by a block-based storage service in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the customer 350 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In some embodiments, an object-based storage service, such as object-based storage service 336, may include a plurality of resource hosts that store snapshot objects and/or other storage objects. For example, object-based storage service 336 includes resource hosts 330a and 330b through 330n storing snapshot objects 328a and 328b through 328n. Additionally, object-based storage service 336 includes resource hosts 334a and 334b through 334n storing storage objects 332a and 332b through 332n. For ease of illustration, snapshot objects 328 and storage objects 332 are illustrated as being stored on different resource hosts of object-based storage service 336. However, in some embodiments a same resource host of an object-based storage service, such as a resource host 330 of object-based storage service 336 may store both storage objects and snapshot objects, for example from a snapshot taken of intermediate results of execution of a hybrid algorithm, from final results from the execution of a of quantum computing object, or from a machine image used by a target volume of a block-based storage service to boot a compute instance, such as one of compute instances 322. Also, a resource host 330 of object-based storage service 336 may store one or more quantum machine images used to boot a compute instance at an edge computing device that coordinates scheduling execution of quantum objects on quantum computer at a quantum hardware provider location where the edge computing device is located.

In addition, service provider network 100 may implement other network-based services 338, which may include various different types of analytical, computational, storage, or other network-based system allowing customers 350, as well as other services of provider network 100 (e.g., a block-based storage service, virtual compute service 326 and/or object-based storage service 336) to perform or request various tasks.

Customers 350 may encompass any type of client configurable to submit requests to network provider 100. For example, a given customer 350 may include a suitable version of a web browser, or may include a plug-in module or other type of code module configured to execute as an extension to or within an execution environment provided by a web browser. Alternatively, a customer 350 may encompass an application such as a database application (or user interface thereof), a media application, an office application or any other application that may make use of compute instances 322, quantum compute service 102, or other network-based service in provider network 100 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 350 may be configured to generate network-based services requests according to a Representational State Transfer (REST)-style network-based services architecture, a document- or message-based network-based services architecture, or another suitable network-based services architecture. In some embodiments, a customer 350 (e.g., a computational client) may be configured to provide access to a compute instance 322 or data storage object 332 in a manner that is transparent to applications implemented on the customer 350 utilizing computational resources provided by the compute instance 322 or storage provided by the storage object 332.

Customers 350 may convey network-based services requests to service provider network 100 via external network 348. In various embodiments, external network 348 may encompass any suitable combination of networking hardware and protocols necessary to establish network-based communications between customers 350 and service provider network 100. For example, a network 348 may generally encompass the various telecommunications networks and service providers that collectively implement the Internet. A network 348 may also include private networks such as local area networks (LANs) or wide area networks (WANs) as well as public or private wireless networks. For example, both a given customer 350 and service provider network 100 may be respectively provisioned within enterprises having their own internal networks. In such an embodiment, a network 348 may include the hardware (e.g., modems, routers, switches, load balancers, proxy servers, etc.) and software (e.g., protocol stacks, accounting software, firewall/security software, etc.) necessary to establish a networking link between given customer 350 and the Internet as well as between the Internet and service provider network 100. It is noted that in some embodiments, customers 350 may communicate with service provider network 100 using a private network rather than the public Internet, such as a direct connection as described in FIG. 2.

Figure 4:
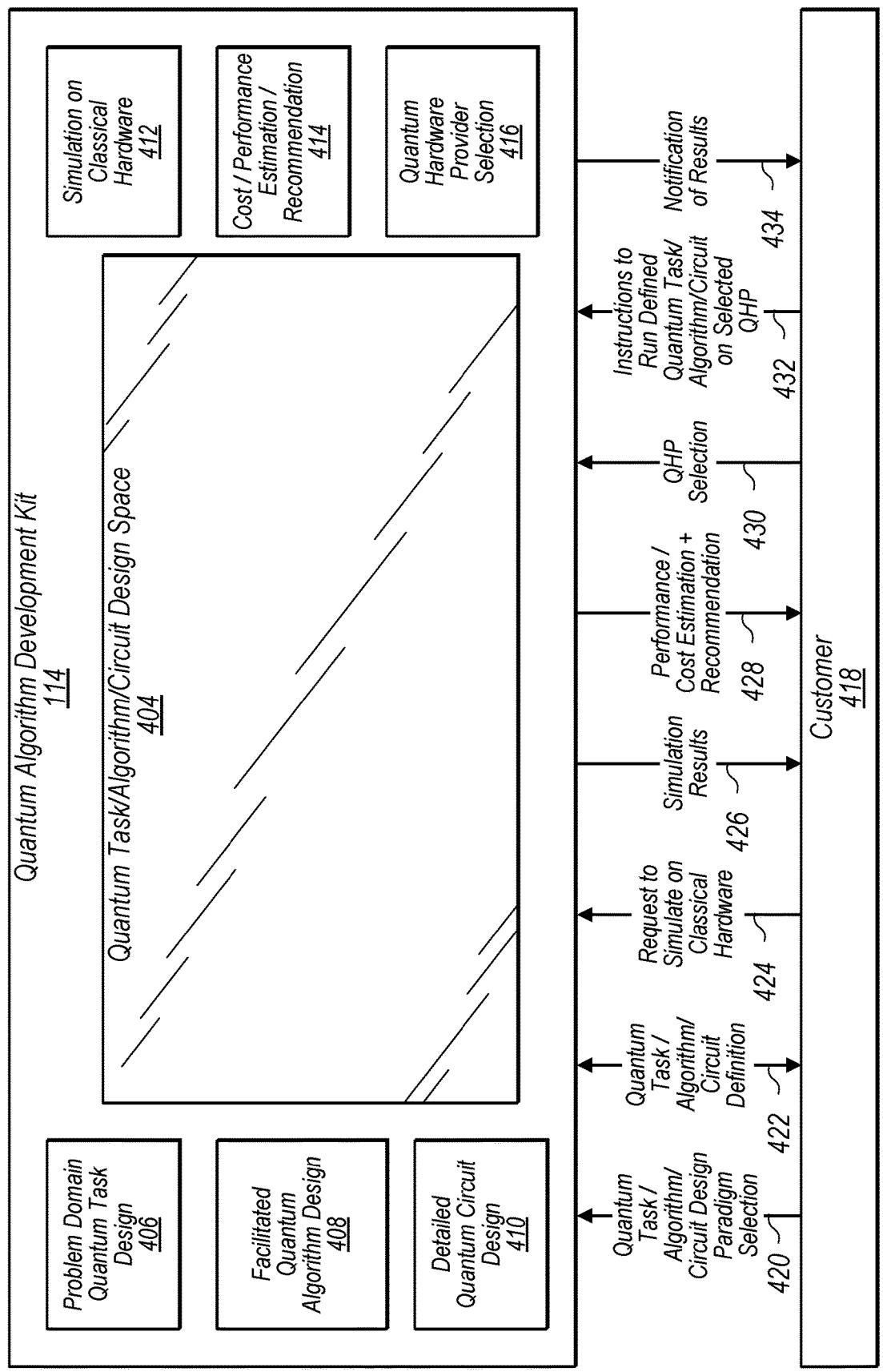
FIG. 4 illustrates an example quantum computing service quantum algorithm development kit interface, according to some embodiments.

FIG. 4 illustrates an example quantum computing service quantum algorithm development kit interface, according to some embodiments.

In some embodiments, a quantum algorithm development kit may support multiple paradigms for defining a quantum circuit. For example, different paradigms may be tailored to customers with different levels of expertise in designing quantum circuits.

Figure 5:
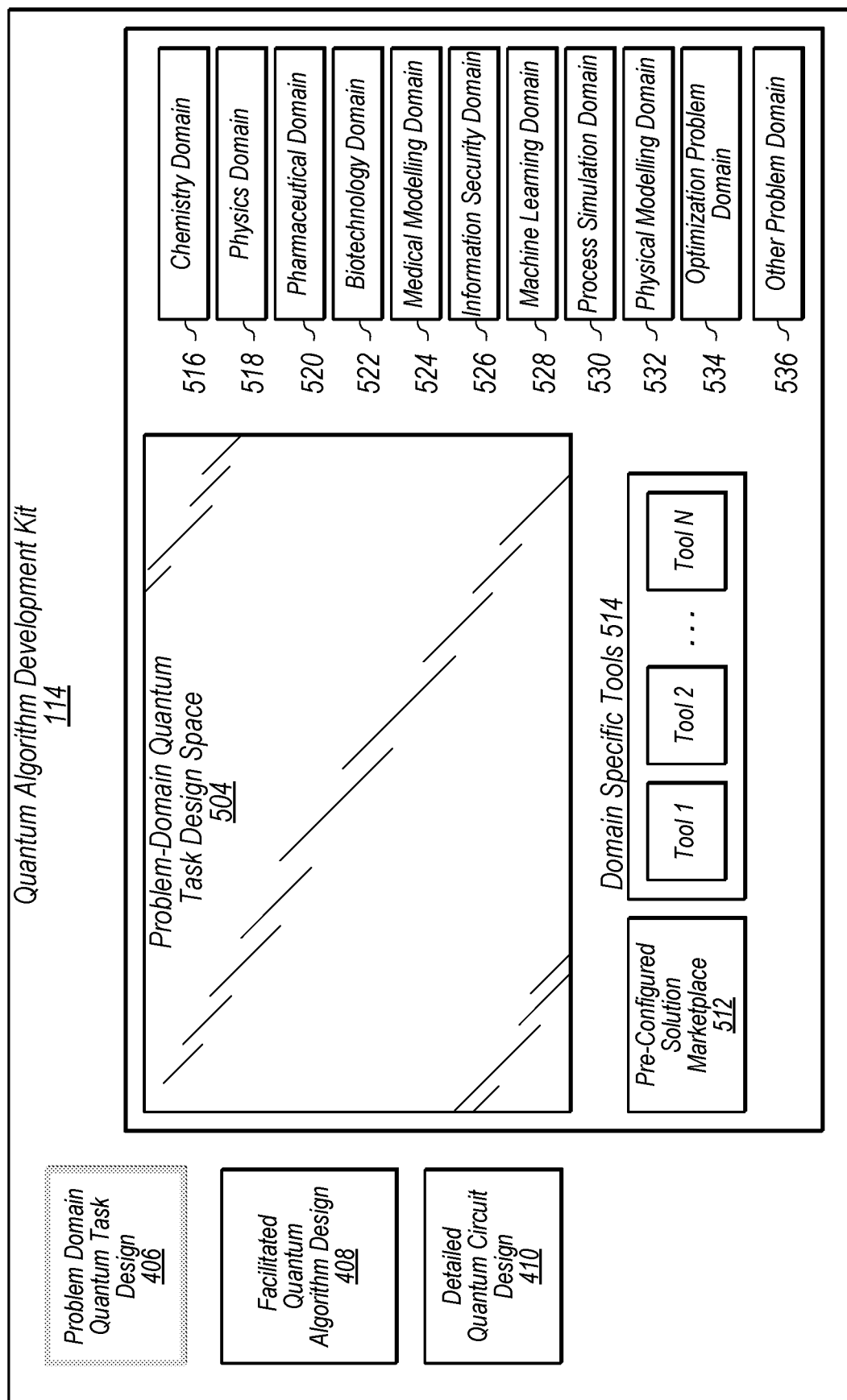
FIG. 5 illustrates an example quantum computing service quantum algorithm development kit interface displaying a problem-domain design paradigm, according to some embodiments.

For example, a less experienced customer may select a problem-domain based paradigm. For example, the customer may select problem domain quantum task button 406 to display a problem-domain based interface for designing a quantum circuit. The problem-domain based interface may include pre-configured quantum algorithms designed for performing particular functions associated with one or more respective problem domains. A customer of the quantum computing service may select an applicable problem-domain for a problem to be solved by the customer. Also within a given problem-domain, the customer may select one or more pre-configured quantum algorithms from the pre-configured quantum algorithms for the selected problem-domain in order to define a quantum algorithm be performed by the quantum computing service as the quantum computing object, such as a quantum circuit. For example, FIG. 5 illustrates an example view of the quantum algorithm development kit 114 when the problem domain quantum task design option 406 is selected. In some embodiments, the quantum task/algorithm/circuit design space 404 may display a quantum object currently being defined via a given selected design paradigm.

Figure 6:
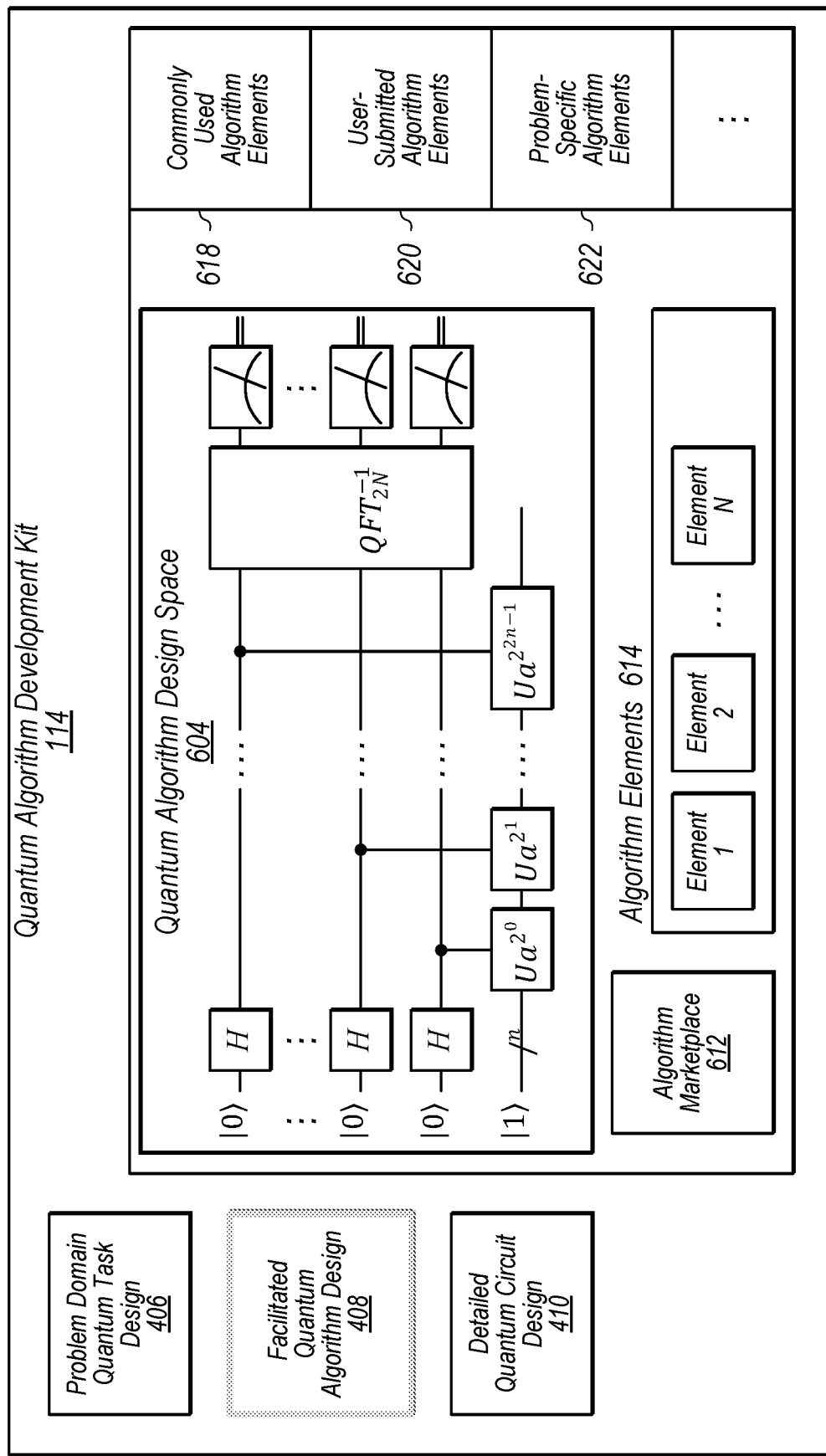
FIG. 6 illustrates an example quantum computing service quantum algorithm development kit interface displaying a quantum algorithm design paradigm, according to some embodiments.

As another example, an intermediate level customer may select a facilitated quantum algorithm design paradigm. The facilitated quantum algorithm design paradigm may be configured such that the quantum computing service 102 facilitates design of a quantum circuit using customer configurable building blocks without the customer being required to understand all the nuances of designing a quantum circuit. For example, a customer may select facilitated quantum algorithm design button 408 to display a quantum algorithm based interface for designing a quantum circuit. The quantum algorithm based interface may include pre-configured quantum logic elements configured to be arranged with one another to form a quantum algorithm, wherein a customer of the quantum computing service selects and/or arranges the pre-configured quantum logic elements to define a particular quantum algorithm to be performed by the quantum computing service as the quantum computing object. For example, FIG. 6 illustrates an example view of the quantum algorithm development kit 114 when the facilitated quantum algorithm design option 408 is selected. In some embodiments, the quantum task/algorithm/circuit design space 404 may display a quantum object currently being defined via the facilitated quantum algorithm design option 408.

Figure 7:
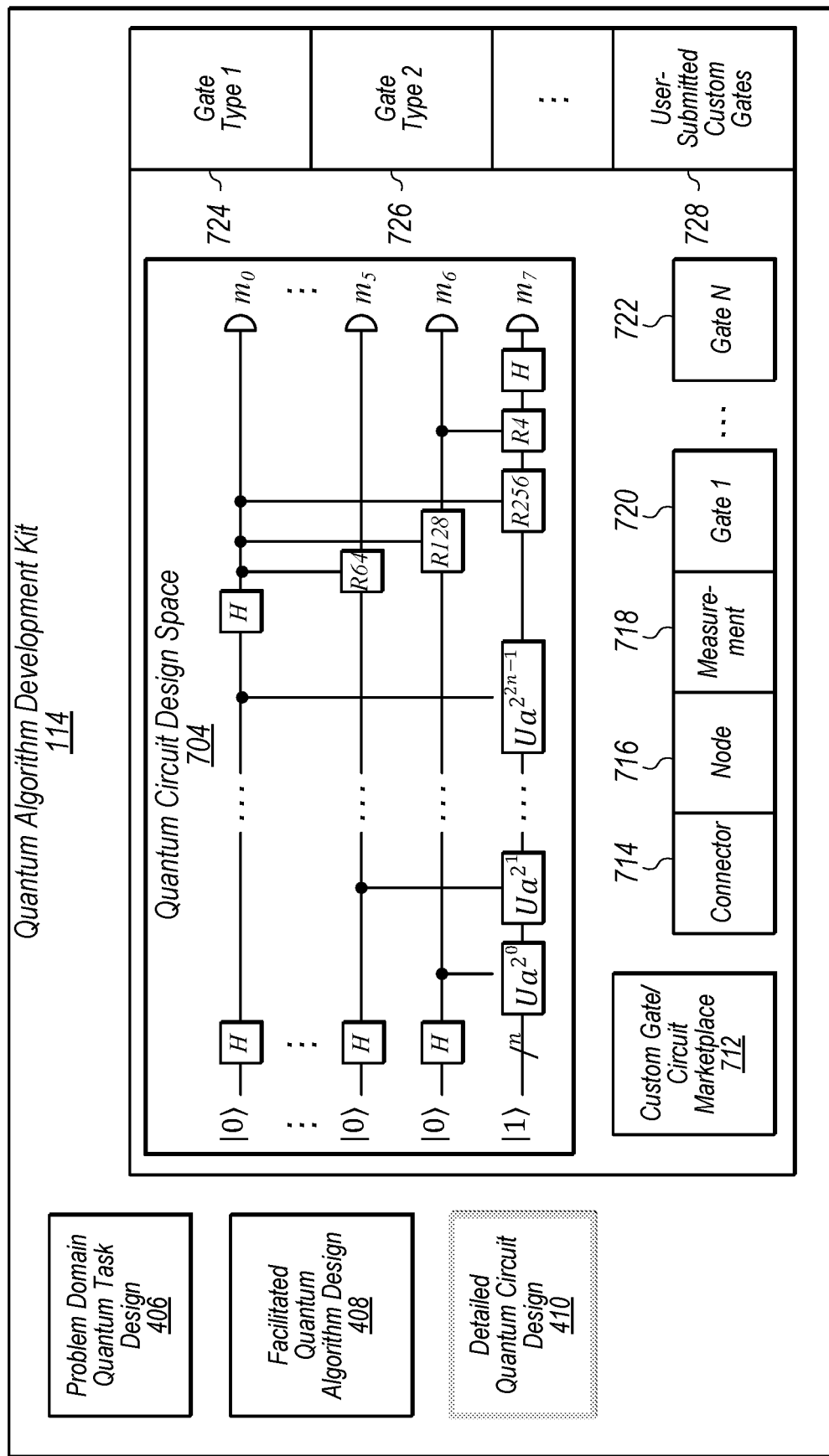
FIG. 7 illustrates an example quantum computing service quantum algorithm development kit interface displaying a quantum circuit design paradigm, according to some embodiments.

Additionally, as another example, a more experienced customer may select a detailed quantum circuit based design paradigm. For example, a quantum circuit design based paradigm may give the customer greater control to customize parameters of a quantum circuit, but may also require the customer to have greater knowledge about quantum computers in order to be able to successfully design a quantum circuit using the quantum circuit based design paradigm. For example, a customer may select detailed quantum circuit design button 410 to display a quantum circuit based interface for designing a quantum circuit. The quantum circuit based interface may include quantum operators and connectors, wherein a customer of the quantum computing service combines the quantum operators and connectors to define a particular quantum circuit to be executed by the quantum computing service 102 as a quantum computing object. For example, FIG. 7 illustrates an example view of the quantum algorithm development kit 114 when the detailed quantum circuit design option 410 is selected. In some embodiments, the quantum task/algorithm/circuit design space 404 may display a quantum circuit currently being defined via the detailed quantum circuit design option 410.

Additionally, a quantum algorithm development kit, such as quantum algorithm development kit 114, may include an option to simulate a quantum circuit being designed wherein the simulation is performed using classical hardware, such as compute instances of a virtual compute service as described in FIG. 3. For example, quantum algorithm development kit 114 includes simulation button 412. Also, a quantum algorithm development kit 114 may include a recommendation button, such as cost/performance estimation/recommendation button 414. For example, selecting cost/performance estimation/recommendation button 414 may cause a customer to be provided with an estimate of performance of a quantum task/algorithm/circuit being designed in the design space 404 and also estimated cost to execute the task/algorithm/circuit using various quantum hardware providers. In some embodiments, selecting cost/performance estimation/recommendation button 414 may cause a customer to be provided with performance and cost estimates for executing the task/algorithm/circuit being designed using various quantum computing paradigms, types of quantum computers, or quantum computer providers. Additionally, in some embodiments, selecting cost/performance estimation/recommendation button 414 may cause a customer to be provided with a recommendation as to which quantum computing paradigm, quantum computer type, or quantum hardware provider to select to execute the task/algorithm/circuit being designed.

In some embodiments, a customer may select a quantum computing paradigm, quantum computer type, and/or quantum hardware provider to execute the task/algorithm/circuit being designed via quantum hardware provider selection button 416. For example, the customer may specify to use an annealing quantum computing paradigm, a circuit based quantum computing paradigm, or an analog or continuous variable quantum computing paradigm. As another example, a customer may specify to use an annealing quantum computing technology, an ion-trap quantum computing technology, a superconducting quantum computing technology, a photon based quantum computing technology, etc. Also, some customers may specify a particular quantum hardware provider and may even specify a particular paradigm or technology to use at the particular quantum hardware provider.

For example, a set of interactions exchanged between a customer and a quantum algorithm development kit to design and execute a quantum task/algorithm/circuit may include the interactions shown in 420 through 434.

For example, at 420 customer 418 may select a design paradigm to use to define a quantum object (e.g. quantum task/algorithm/circuit) to be submitted to the quantum computing service for execution on a quantum computer of a quantum hardware provider or a simulator. At 422, customer 418 may provide a definition for the quantum object using the selected design paradigm. For example customer 418 may define the quantum object in the design space 404 using the various tools available for use in the different design paradigms.

At 424, customer 418 may request to simulate the quantum object defined in design space 404 by selecting simulation button 412. At 426, the quantum algorithm development kit 114 may provide customer 418 with simulation results. For example, the simulation results may be displayed in design space 404. Also, at 428 the quantum algorithm development kit 114 may provide customer 418 with a performance/cost estimate and/or a recommendation. For example, in response to the customer 418 selecting cost/performance estimation/recommendation button 414.

At 430, customer 418 may select a quantum hardware provider and/or quantum computer type to be used to execute the quantum object defined by the customer 418. In some embodiments, in response to the simulation results and/or performance and cost estimate, the customer 418 may return to 422 and modify the quantum object definition. Also, while not shown, the customer 418 may additionally simulate the defined quantum object on a simulator that simulates performance of the selected quantum hardware provider and/or quantum computer technology type. For example, the simulator may perform simulation that specifically simulates executing the defined quantum object using a particular quantum computing paradigm, a particular quantum computing technology, or a particular quantum hardware provider, etc.

If customer 418 is satisfied with the definition of the customer's quantum object, at 432 the customer 418 may submit the defined quantum object (e.g. quantum task, quantum algorithm, quantum circuit) to be executed on the selected quantum hardware provider. The quantum computing service may translate the quantum object (e.g. quantum task, quantum algorithm, quantum circuit) into a quantum circuit translated into a format suitable to be executed on a quantum computer of the selected quantum hardware provider. In some embodiments, a quantum algorithm development kit may automatically select a quantum hardware provider to execute the customer's quantum object based on characteristics of the quantum object (e.g. quantum task, quantum algorithm, quantum circuit) and properties of the quantum computers at the quantum hardware providers, and/or based on other considerations such as load balancing, costs, etc. Thus, in some embodiments, a customer may simplify define a quantum object and submit the defined quantum object for execution.

Once the quantum object has been executed and results have been generated, the quantum computing service may, at 434, notify customer 418 that the results are available. In some embodiments, such as when executing a hybrid quantum computing algorithm, the results notification may be presented to a classical computer executing a classical computing portion of the hybrid algorithm and a customer may be notified when the hybrid algorithm has completed, but not necessarily be notified for each step of the hybrid algorithm that generates intermediate quantum computing results.

FIG. 5 illustrates an example quantum computing service quantum algorithm development kit interface displaying a problem-domain design paradigm, according to some embodiments.

In some embodiments, a quantum algorithm development kit 114 may provide a customer with multiple problem domains to select from when a problem-domain design paradigm is selected. For example FIG. 5 illustrates quantum algorithm development kit 114 with problem domain quantum task design button 406 selected. The quantum algorithm development kit presents a quantum task design space 504 along with a plurality of problem domains for a customer to select from. For example, quantum algorithm development kit 114 provides problem domain options for: a chemistry domain 516, a physics domain 518, a pharmaceutical domain 520, a biotechnology domain 522, a medical modelling domain 524, an information security domain 526, a machine learning domain 528, a process simulation domain 530, a physical modelling domain 532, an optimization problem domain 534 and/or other problem domains 536. Note that the problem domains shown in FIG. 5 are provided as example problem domains that may be supported by a quantum algorithm development kit 114 and should not be interpreted as an exhaustive list of all problem domains that may be supported.

A quantum algorithm development kit 114 may be configured to provide a customer with domain specific design tools 514 based on which of the problem domains is selected. For example, if the chemistry domain 516 is selected, domain specific tools 514 may include pre-configured quantum algorithms typically used to solve chemistry related problems. In a similar manner, if the physics domain 518 is selected, domain specific tools 514 may include pre-configured quantum algorithms typically used to solve physics related problems. If other ones of the problem domains are selected, the domain specific tools 514 may be adjusted accordingly to include pre-configured quantum algorithms useful for solving problems in a given selected problem domain.

In some embodiments, selecting a particular one of the tools of the domain specific tools 514 may cause a pre-configured quantum algorithm element to be added to the quantum object (e.g. quantum task/algorithm/circuit) being designed in quantum task design space 504. The customer may then modify the pre-configured quantum algorithm element, arrange it with other pre-configured quantum algorithm elements to define the quantum object, or provide input parameters or other parameters to the pre-configured quantum algorithm element or the overall quantum object being defined.

In some embodiments, a customer may save a quantum object designed in quantum task design space 504 for later use. Also, in some embodiments, a customer may contribute a quantum object designed in quantum design space 504 to a sharing application, such as a marketplace that enables other customers of the quantum computing service to use the quantum object. For example, a chemistry customer may define a quantum object for determining an energy state for a particular molecule and may select pre-configured solution marketplace button 512 to submit the quantum object for determining the energy state for the particular molecule to a shared marketplace. This may allow other customers of the quantum computing service to use the already defined quantum object to solve similar problems. Also, in some embodiments, the customer may be compensated when another customer uses the customer's pre-defined quantum object. In other embodiments a pre-configured solution marketplace may be open source, such that the customer grants access to the customer's pre-defined quantum object with the expectation of being able to access other quantum objects defined by other customers to solve other problems, such as determining energy states of other molecules.

In some embodiments, a customer may select a pre-defined quantum object from a pre-configured solution marketplace and may further modify or combine the pre-defined quantum object with other elements to form a new quantum object. This may be done in quantum task design space 504. The customer may then cause the modified quantum object to be executed on a quantum computer and/or provide the modified quantum object back to the pre-configured solution marketplace.

FIG. 6 illustrates an example quantum computing service quantum algorithm development kit interface displaying a quantum algorithm design paradigm, according to some embodiments.

As another example, a customer may select to use a quantum algorithm design paradigm to define a quantum object to be executed via the quantum computing service. For example, FIG. 6 illustrates quantum algorithm development kit 114 with facilitated quantum algorithm design button 408 selected. In this design paradigm, quantum algorithm design space 604 may display a quantum algorithm being designed by the customer. As an example of a quantum algorithm, quantum algorithm design space illustrates an example view of Shor's algorithm which may be further modified by a customer or used to define a quantum object.

When the quantum algorithm design paradigm is selected, quantum algorithm logic element selection options such as 618, 620, and 622 may be displayed. A customer may select one of the options, such as commonly used algorithm elements 618 to cause commonly used algorithm elements to be displayed in algorithm elements 614 at the bottom of the quantum algorithm design space 604. The customer may then select quantum algorithm logic elements included in algorithm elements 614 to define a quantum object (e.g. quantum algorithm) in design space 604. Also, a customer may provide a defined quantum algorithm to an algorithm marketplace or use a quantum algorithm from a quantum algorithm marketplace by selecting algorithm marketplace option 612.

FIG. 7 illustrates an example quantum computing service quantum algorithm development kit interface displaying a quantum circuit design paradigm, according to some embodiments.

As another example, a customer may select to use a quantum circuit design paradigm to define a quantum object to be executed via the quantum computing service. For example, FIG. 7 illustrates quantum algorithm development kit 114 with detailed quantum circuit design 410 selected. In this design paradigm, quantum circuit design space 704 may display a quantum circuit being designed by the customer. As an example of a quantum circuit, quantum circuit design space illustrates an example view of Shor's algorithm converted into a quantum circuit using gates in place of the inverse quantum Fourier transform as shown in FIG. 6. In a quantum circuit design paradigm a customer may select and/or arrange particular quantum gates to define a quantum object. For some quantum computing paradigms, such as annealing, that do not use gates, other types of quantum operators may be used in a detailed design space to define a quantum object to be executed by the quantum computing service.

When the quantum circuit design paradigm is selected, quantum gate selection options such as 724, 726, and 728 may be displayed. In some embodiments, a customer may submit their own custom gate type, for example via option 728.

A customer may select one of the options, such as gate type 724 to cause quantum gates of the selected gate type to be displayed in gate 720 through gate 722, which may include any number of gates. Also, the quantum circuit design paradigm may include connector tool 714, node tool 716, and measurement tool 718. These tools may be used to add connectors, nodes, and measurement points to a quantum circuit being designed in quantum circuit design space 704. In some embodiments, a customer may provide a defined quantum circuit or a customer's custom gate type to a custom gate/circuit marketplace or use a quantum circuit or gate from a custom gate/circuit marketplace by selecting custom gate/circuit marketplace option 712.

Figure 8:
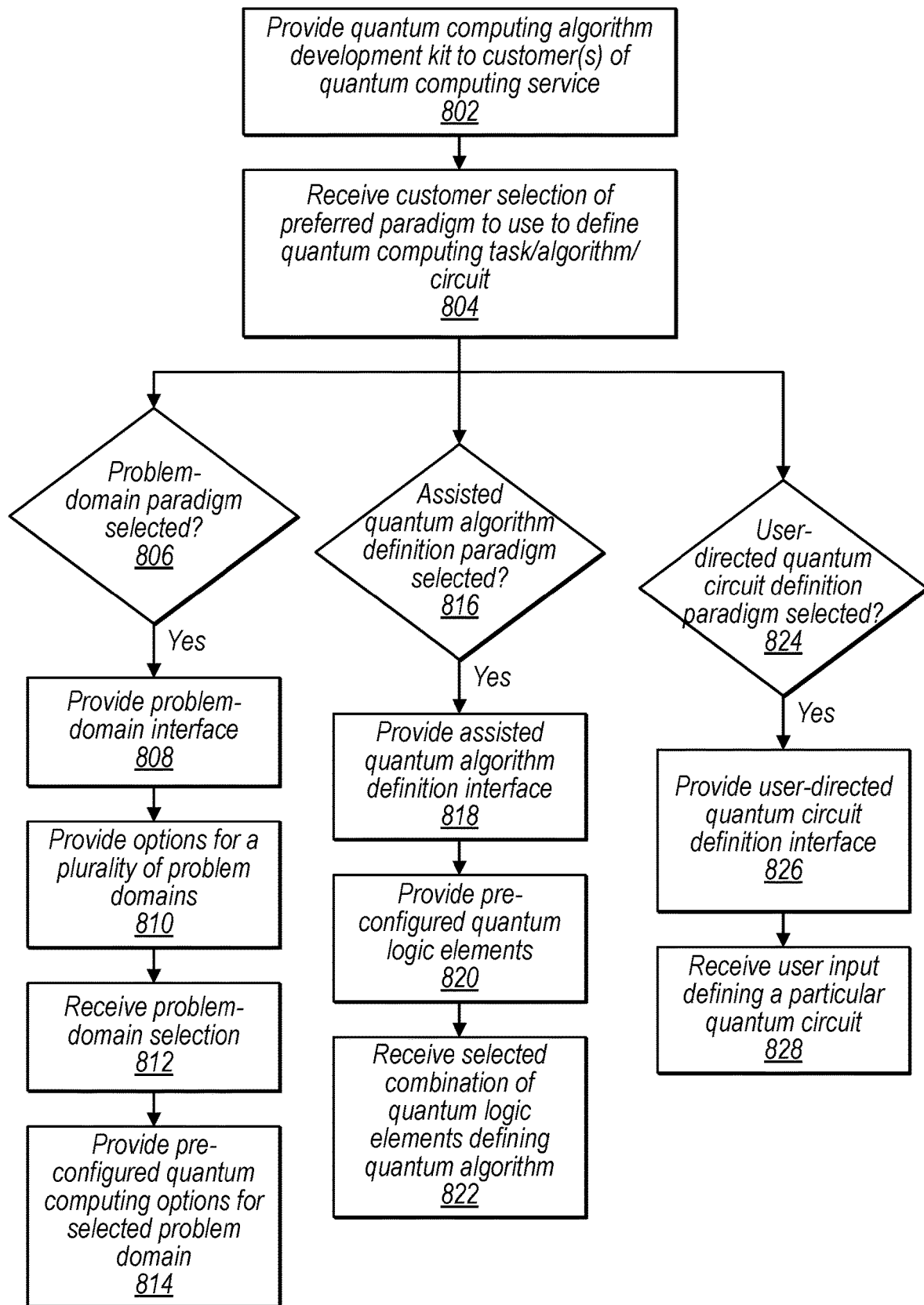
FIG. 8 illustrates an example flowchart for designing a quantum task, algorithm, or circuit using a quantum algorithm development kit interface, according to some embodiments.

FIG. 8 illustrates an example flowchart for designing a quantum task, algorithm, or circuit using a quantum algorithm development kit interface, according to some embodiments.

At 802, a quantum computing service provides a quantum algorithm development kit to customers of the quantum computing service, such as quantum algorithm development kit 114.

At 804, the quantum computing service receives a customer selection of a preferred design paradigm to use to define a quantum object to be executed by the quantum computing service, such as a quantum task, quantum algorithm, or quantum circuit to be executed by the quantum computing service using a quantum computer of a quantum hardware provider.

If it is determined at 806 that a problem-domain design paradigm is selected, the quantum computing service, at 808, provides a problem domain interface to the customer. At 810, the quantum computing service provides, via the problem domain interface, options for a plurality of problem domains. At 812, the quantum computing service receives a customer selection of a problem domain to be used to define a quantum object to be executed by the quantum computing service. At 814, the quantum computing service provides pre-configured quantum computing objects, such as pre-configured quantum algorithms, for the selected problem domain to the customer to define a quantum object to be executed by the quantum computing service.

If it is determined at 816, that an assisted quantum algorithm definition design paradigm is selected, the quantum computing service, at 818, provides the assisted quantum algorithm definition interface to the customer. At 820, the quantum computing service provides pre-configured quantum logic elements to the customer via the assisted quantum algorithm definition interface. At 822, the quantum computing service receives a selected combination of quantum logic elements defining a quantum object to be executed by the quantum computing service.

If it is determined at 824, that a user-directed quantum circuit definition design paradigm has been selected, the quantum computing service, at 826, provides a user-directed quantum circuit definition interface to the customer. At 828, the quantum computing service receives user input defining a particular quantum circuit via the user-directed quantum circuit definition interface.

Figure 9:
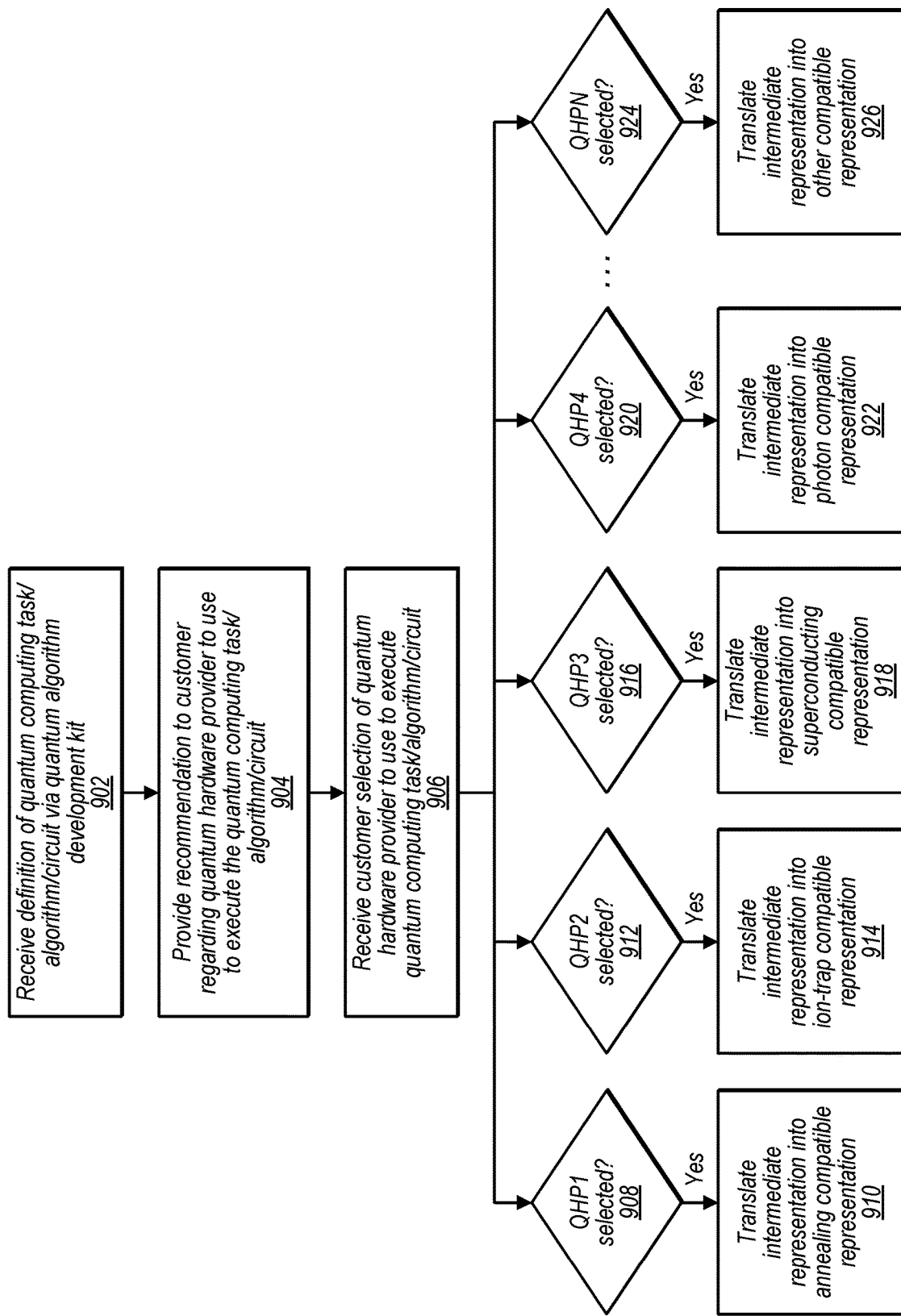
FIG. 9 illustrates example translations of a quantum task, algorithm, or circuit defined via a quantum algorithm development kit interface into quantum computing technology specific representations, according to some embodiments.

FIG. 9 illustrates example translations of a quantum task, algorithm, or circuit defined via a quantum algorithm development kit interface into quantum computing technology specific representations, according to some embodiments.

At 902, the quantum computing service receives a definition of a quantum object to be executed by the quantum computing service using a quantum computer of a quantum hardware provider. For example, the quantum object may be a quantum task defined via a problem-domain paradigm interface, a quantum algorithm defined via a quantum algorithm design interface, a quantum circuit defined via a quantum circuit design interface, etc.

At 904, the quantum computing service provides a recommendation to the customer regarding a recommended quantum hardware provider to use to execute the quantum object.

At 906, the quantum computing service receives a customer selection of a quantum hardware provider to use to execute the quantum object. In some embodiments, the selection may simply accept the recommendation of the quantum computing service, or may specify various details, such as what type of quantum computer technology to use or a particular quantum hardware provider to use to execute the customer's quantum object.

The quantum computing service may then automatically translate the quantum object as defined by the customer in an intermediate representation that is neutral to the various quantum technologies and quantum hardware providers supported by the quantum computing service, into a particular quantum circuit format supported by the selected quantum hardware provider.

For example, if a first quantum hardware provider is selected at 908, at 910 the quantum computing service may translate the quantum object defined by the customer into a quantum circuit representation compatible with an annealing based quantum computer.

As another example, if a second quantum hardware provider is selected at 912, at 914 the quantum computing service may translate the quantum object defined by the customer into a quantum circuit representation compatible with an ion-trap based quantum computer.

As another example, if a third quantum hardware provider is selected at 916, at 918 the quantum computing service may translate the quantum object defined by the customer into a quantum circuit representation compatible with a superconducting based quantum computer.

As another example, if a fourth quantum hardware provider is selected at 920, at 922 the quantum computing service may translate the quantum object defined by the customer into a quantum circuit representation compatible with a photon based quantum computer.

As another example, if an Nth quantum hardware provider is selected at 924, at 926 the quantum computing service may translate the quantum object defined by the customer into a quantum circuit representation compatible with the Nth based quantum computer. Note that "N" is used to signify that in some embodiments, a quantum computing service may support any number of quantum computing technologies.

Examples of Translation from an Intermediate Representation to a Quantum Computing Technology Specific Representation In some embodiments, a quantum computing service may define quantum objects using an intermediate representation and then translate the quantum objects into quantum hardware specific quantum circuit representations before making the quantum circuits available to be transported to an edge computing device at a quantum hardware provider location for execution on a quantum computer of the quantum hardware provider.

For example, a quantum computing service may support both circuit based quantum computers and annealing based quantum computers (which use a different language to define a quantum task than a circuit based quantum computer). For example not all gates may be supported by each quantum computing technology supported by the quantum computing service. Thus the quantum computing service may translate quantum operators supported in a particular quantum computing technology into an equivalent representation in another quantum computing technology. For example, a gate defined in a circuit based quantum computing technology may not have an analogous gate in an annealing based quantum computing technology. Thus, a quantum computing service may translate the circuit based gate into an equivalent representation having similar functionality in the annealing quantum computing technology. In some embodiments, in order to provide a representation with similar functionality, a single gate in a first quantum computing technology may be translated into a sequence of gates or quantum operators in a second quantum computing technology. Additionally, after substituting quantum operators for equivalent representations, a quantum computing service may perform one or more operations to determine if a quantum operator count of the translated quantum circuit representation can be reduced without significantly affecting functionality. For example some sets of gates may be replaced with fewer gates.

Also, in some embodiments a quantum computing service may translate an intermediate representation of a quantum object into a representation to be executed on a quantum computer simulator. In some embodiments, a simulator may support a defined set of quantum operators, which may vary from a set of quantum operators supported by a particular quantum computing technology quantum computer.

In some embodiments, a quantum computing service may support translation of customer defined gates into a set of one or more quantum operators available in a particular quantum computing technology or available at a particular quantum hardware provider.

In some embodiments, a quantum computing service may provide a customer with access to a translated quantum circuit representation as it is to be executed at the quantum hardware provider. This may assist the customer with troubleshooting and designing the customer's quantum circuit.

In some embodiments, a quantum computing service may further include hardware specific optimizers that optimize the translated quantum circuits based on characteristics of a particular type of quantum computing hardware.

In some embodiments, a quantum computing service may translate a quantum object in an intermediate representation into two or more quantum hardware specific quantum circuit representations. For example, a customer may desire to execute the quantum object using two different types of quantum computers. In such a case, the quantum computing service may automatically translate the customer's quantum object into a first and a second quantum circuit representation, each suitable for a respective one of the two different types of quantum computers.

Figure 10:
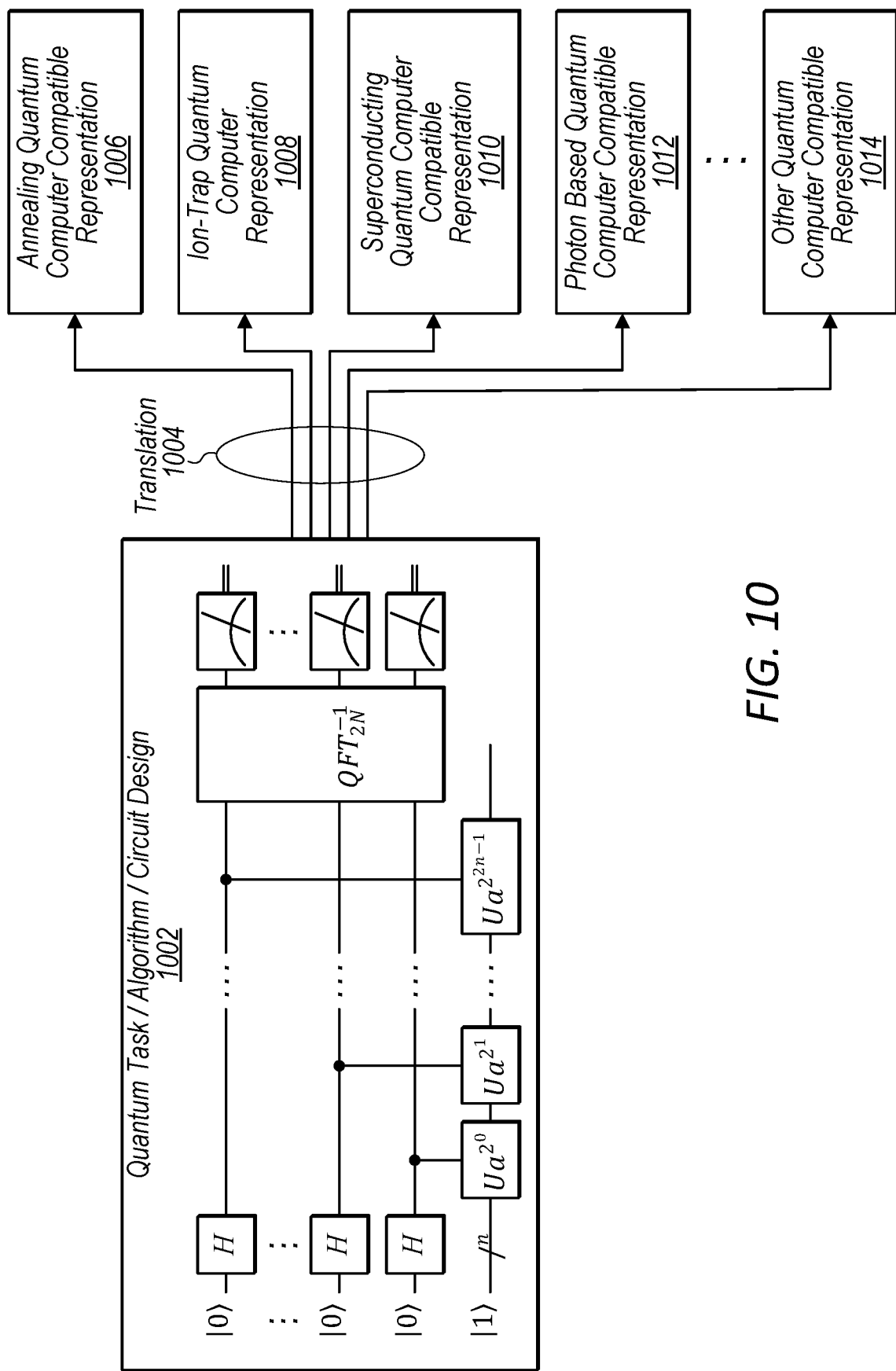
FIG. 10 illustrates example translations of an intermediate representation of a quantum task, algorithm, or circuit into any of a plurality of supported quantum computing technology representations, according to some embodiments.
Figure 11:
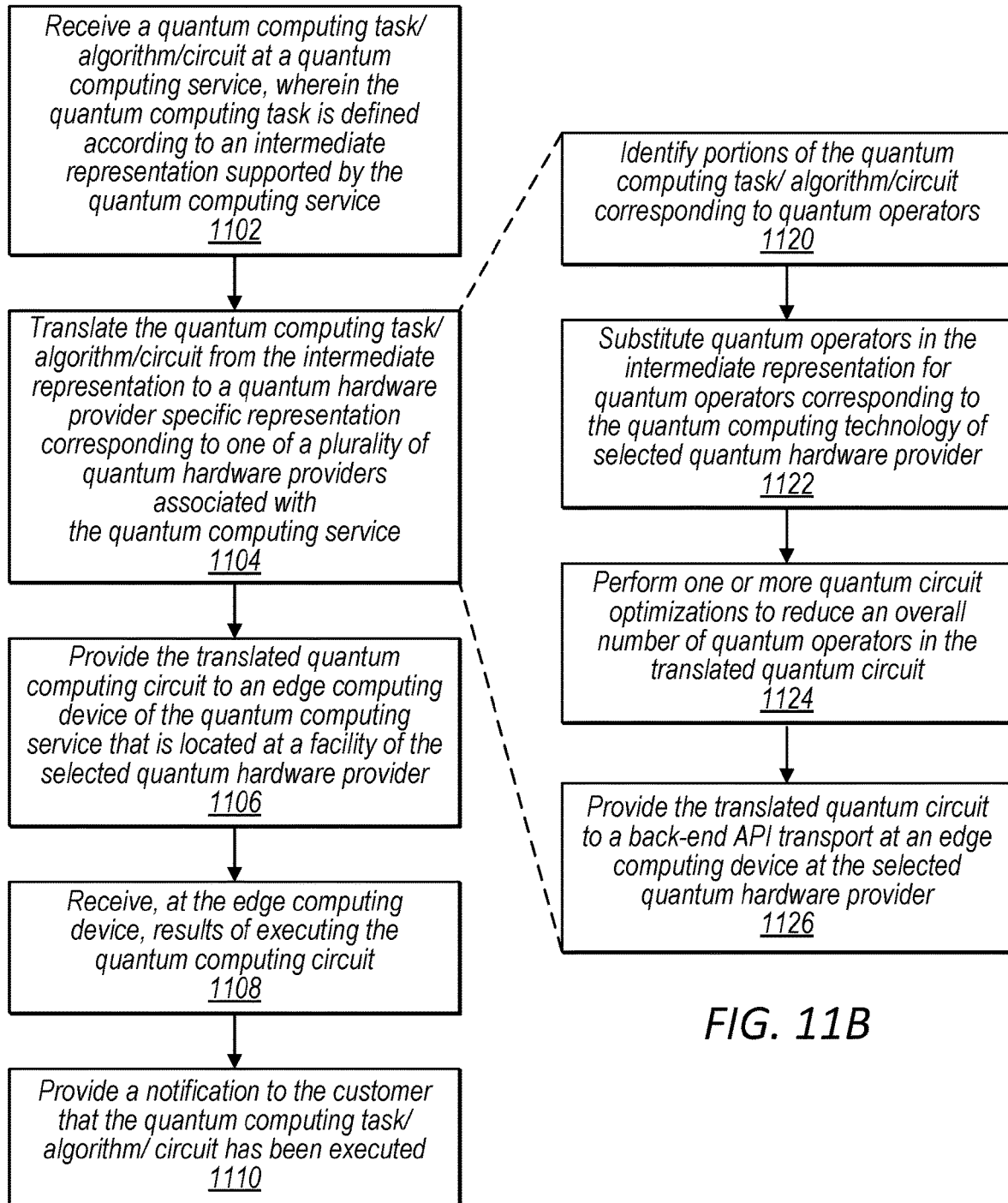
FIG. 11A illustrates a process involving a quantum computing service receiving, translating, and executing a quantum task, algorithm, or circuit, according to some embodiments.
FIG. 11B illustrates additional steps that may be performed to translate a quantum task, algorithm, or circuit from an intermediate representation to a quantum computing technology specific representation, according to some embodiments.

FIG. 10 illustrates example translations of an intermediate representation of a quantum task, algorithm, or circuit into any of a plurality of supported quantum computing technology representations, according to some embodiments.

For example, FIG. 10 illustrates a quantum object 1002 that is a quantum algorithm being translated at 1004 into multiple quantum computing technology specific representations, such as an annealing quantum computer compatible representation 1006, an ion-trap quantum computer representation 1008, a superconducting quantum computer compatible representation 1010, a photon based quantum computer compatible representation 1012, and/or another quantum computer compatible representation 1014.

FIG. 11A illustrates a process involving a quantum computing service receiving, translating, and executing a quantum task, algorithm, or circuit, according to some embodiments.

At 1102, a quantum computing service receives a quantum object, such as a quantum computing task/algorithm/circuit, wherein the quantum computing object is defined according to an intermediate representation supported by the quantum computing service.

At 1104, the quantum computing service translates the quantum computing task/algorithm/circuit from the intermediate representation to a quantum hardware provider specific representation corresponding to one of a plurality of quantum hardware providers associated with the quantum computing service. For example the quantum computing task/algorithm/circuit may be translated into a quantum circuit in a format supported by a particular one of the quantum hardware providers affiliate with the quantum computing service.

At 1106, the quantum computing service provides the translated quantum computing circuit to an edge computing device of the quantum computing service that is located at a facility of the selected quantum hardware provider.

At 1108, the edge computing device receives results of executing the quantum computing circuit on the quantum computer of the selected quantum hardware provider.

At 1110, the quantum computing service provides a notification to the customer that the quantum computing task/algorithm/circuit has been executed.

FIG. 11B illustrates additional steps that may be performed to translate a quantum task, algorithm, or circuit from an intermediate representation to a quantum computing technology specific representation, according to some embodiments.

In some embodiments translation as described at 1104 may further include the steps of 1120, 1122, 1124, and 1126.

At 1120, a translation module of a quantum computing service, such as translation module 112 of quantum computing service 102, identifies portions of the quantum computing task/algorithm/circuit corresponding to quantum operators.

At 1122, the translation module substitutes quantum operators in the intermediate representation for quantum operators corresponding to the quantum computing technology of selected quantum hardware provider.

At 1124, the translation module performs one or more quantum circuit optimizations to reduce an overall number of quantum operators in the translated quantum circuit.

At 1126, the translation module provides the translated quantum circuit to a back-end API transport for delivery to an edge computing device at the selected quantum hardware provider.

Figure 12:
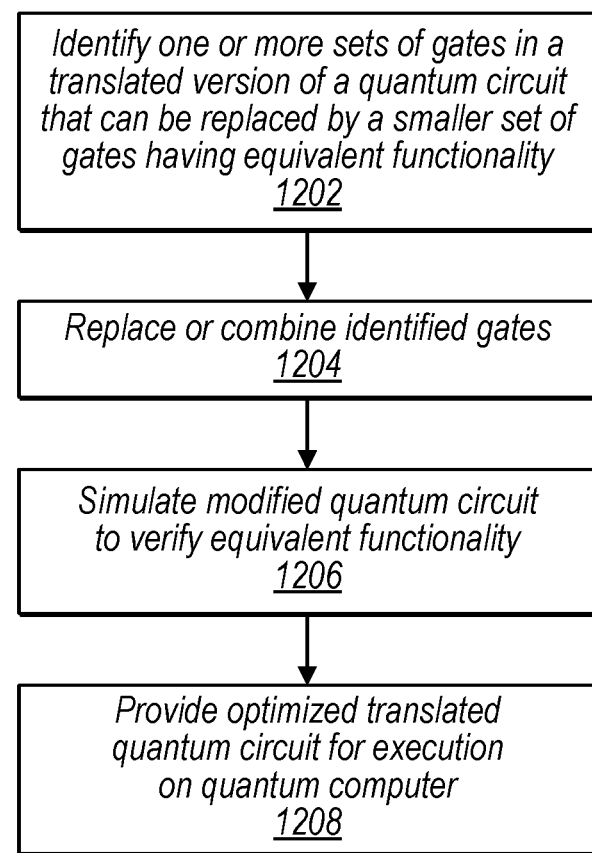
FIG. 12 illustrates an example quantum circuit optimization process, according to some embodiments.

FIG. 12 illustrates an example quantum circuit optimization process, according to some embodiments.

In some embodiments, to perform an optimization, a translation module, at 1202, identifies one or more sets of gates in a translated version of a quantum circuit that can be replaced by a smaller set of gates having equivalent functionality.

At 1204, the translation module replaces or combines the identified gates. At 1206, the translation module may optionally simulate the modified quantum circuit to verify equivalent functionality. At 1208, the translation module may provide the optimized translated quantum circuit for execution, via a back-end API transport. In some embodiments, translation as described herein, may be performed prior to the quantum object being transport to an edge computing device at a quantum hardware provider location. However, in other embodiments, translation may be performed by an edge computing device at the quantum hardware provider location.

Example Edge Computing Device Located at a Quantum Hardware Provider Location

Figure 13:
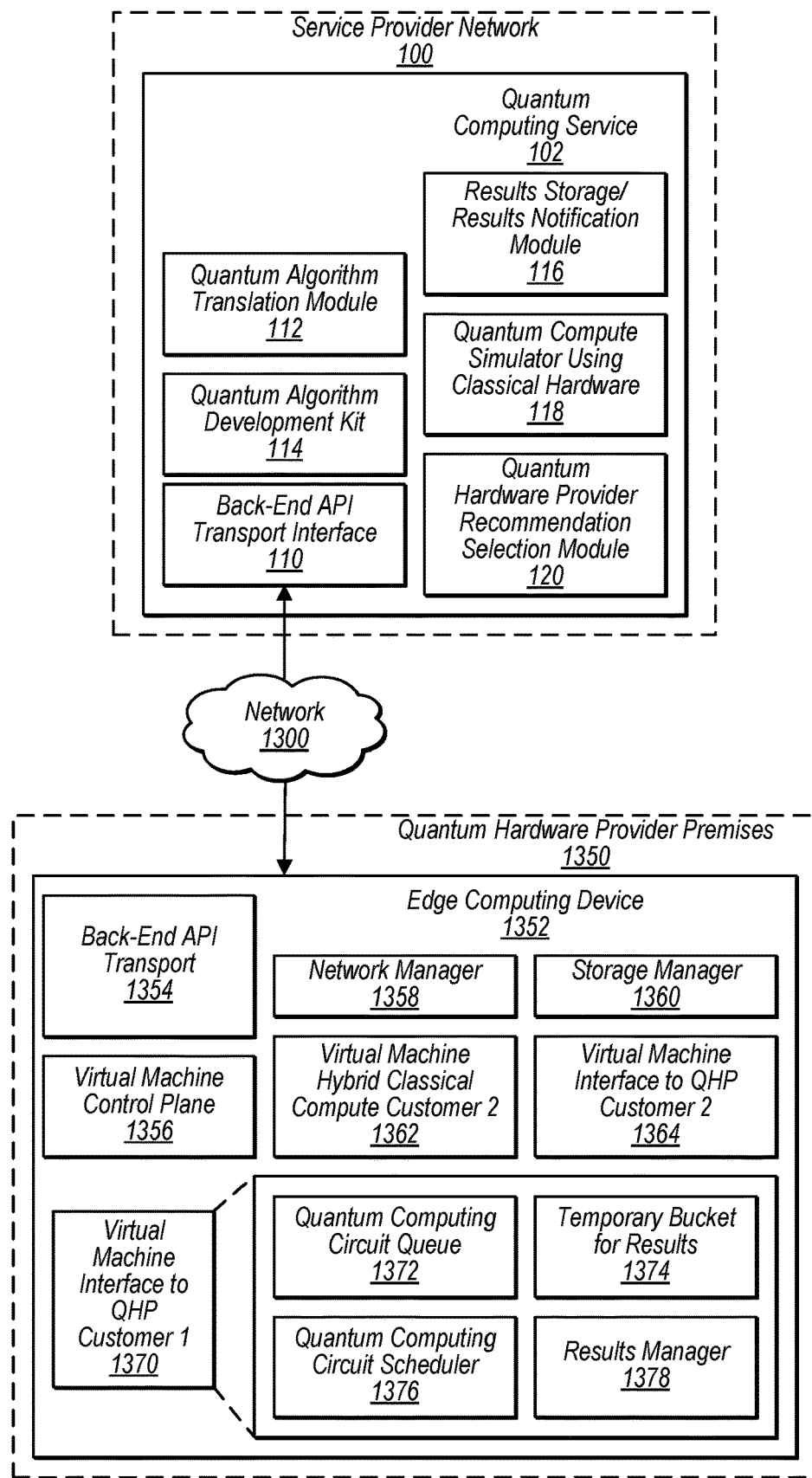
FIG. 13 illustrates an example edge computing device connected to a quantum computing service, according to some embodiments.

FIG. 13 illustrates an example edge computing device connected to a quantum computing service, according to some embodiments.

Service provider network 100 and quantum computing service 102 may be similar to the service provider networks and quantum computing services described herein, such as in FIGS. 1-3. Also, edge computing device 1352 may be a similar edge computing device as any of the edge computing devices described previously, such as in FIGS. 1-3. Edge computing device 1352 is connected to service provider network 100 via network connection 1300, which may be a logically isolated network connection via a public network, a dedicated physical non-public network link, or other suitable network connection.

Edge computing device 1352 includes network manager 1358, storage manager 1360, and virtual machine control plane 1356. In some embodiments, these components may be implemented on a virtualization offloading component, such as a virtualization offloading card described in more detail below in regard to FIGS. 19 and 20, and also described above.

In some embodiments, a back-end application programmatic interface (API) transport of an edge computing device, such as back-end API transport 1354 of edge computing device 1352 may ping a quantum computing service to determine if there are quantum circuits waiting to be transported to the edge computing device. The edge computing device may further use a non-public back-end API transport, such as back-end API transport 1354 to bring the quantum circuit into the edge computing device 1352.

Additionally, for each customer, a back-end API transport of an edge computing device of a quantum computing service, such as back-end API transport 1354 of edge computing device 1352, may cause a virtual machine to be instantiated to manage scheduling and results for a given quantum circuit pulled into the edge computing device from a back-end API. For example, virtual machine 1370 may act as an interface to the quantum hardware provider for a given customer of the quantum computing service. The edge computing device may be directly connected to a local non-public network at the quantum hardware provider location and may interface with a scheduling component of the quantum hardware provider to schedule availability (e.g. time slots) on a quantum computer of the quantum hardware provider.

In some embodiments, the virtual machine 1370 may be booted with a particular quantum machine image that supports interfacing with the scheduling component of the quantum hardware provider.

In some embodiments, virtual machine 1370 may be booted with a quantum circuit queuing component 1372, a quantum circuit scheduling component 1376, a component that manages a local storage bucket on the edge computing device to temporarily stores results, such as temporary bucket 1374 and results manager 1378.

In some embodiments, an edge computing device, such as edge computing device 1352, may support multi-tenancy. Also, in some embodiments, edge computing device 1352 may also instantiate virtual machines that execute classical computing tasks, such as a classical computing portion of a hybrid algorithm. For example, edge computing device 1352 also includes a virtual machine 1362 for another customer that performs classical compute portions of a hybrid algorithm and an additional virtual machine 1364 for the other customer which acts as a quantum hardware provider interface for the other customer.

In some embodiments, a back-end API transport of an edge computing device located a quantum hardware provider location may interface with a back-end API transport interface 110 of a computing device/router at a remote location where one or more computing devices that implement the quantum computing service are located.

Note that edge computing device 1352 may be physically located at quantum hardware provider premises 1350, such as in a building of a quantum hardware provider facility.

In some embodiments, the components of virtual machine 1370 may be included in back-end API transport 1354, and the back-end API transport 1354 may execute the related components within the back-end API transport without causing a separate VM 1370 to be instantiated.

Figure 14:
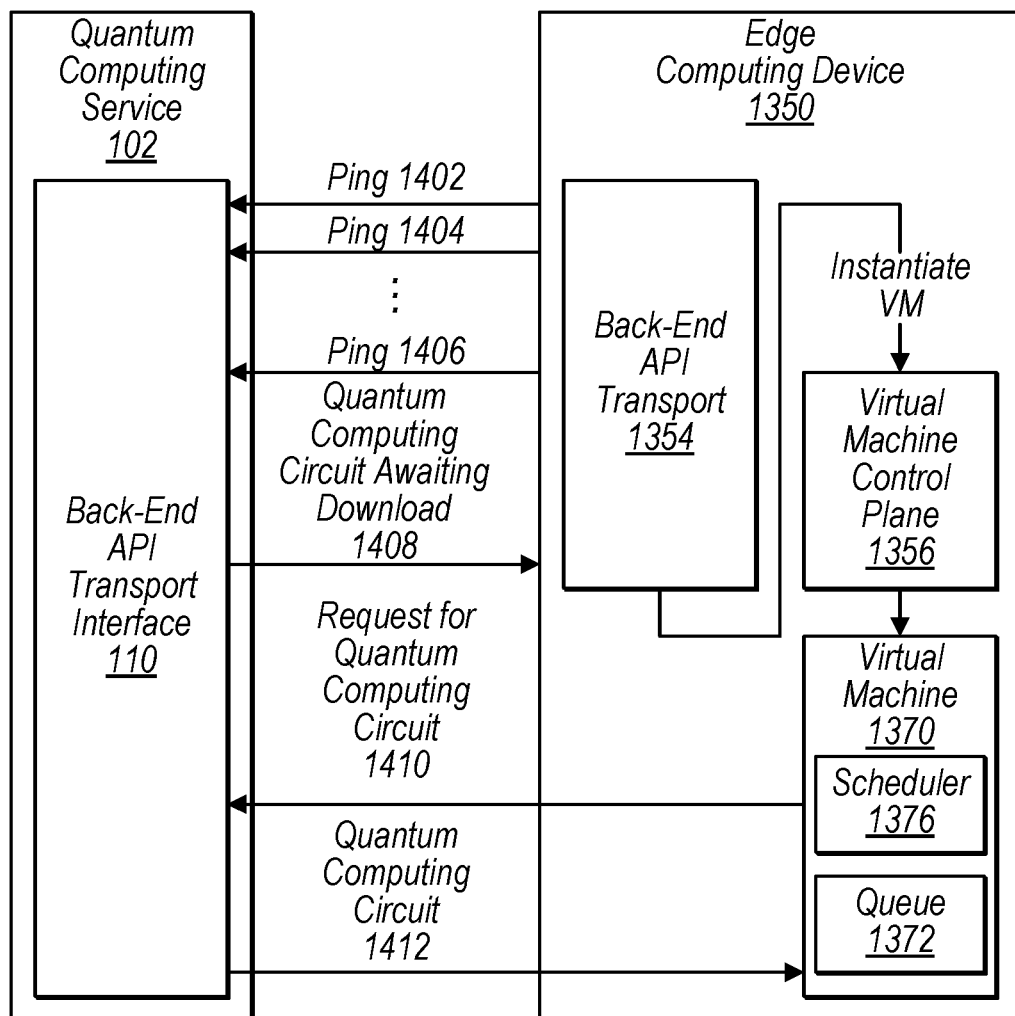
FIG. 14 illustrates example interactions between a quantum computing service and an edge computing device of the quantum computing service, according to some embodiments.

FIG. 14 illustrates example interactions between a quantum computing service and an edge computing device of the quantum computing service, according to some embodiments.

A back-end API transport 1354 of edge computing device 1352 may submit pings 1402, 1404, 1406, etc. to quantum computing service 102 to determine whether there is a quantum computing circuit to be transported to edge computing device 1352. At 1408, the quantum computing service 102 may indicate to the edge computing device 1352 that there is a translated quantum circuit ready to be transported to the edge computing device 1352. In response, back-end API transport 1354, may cause virtual machine control plane 1356 to instantiate a virtual machine 1370 to act as an interface for the customer to the quantum hardware provider. At 1410 the VM 1370 may call the back-end API transport 1354 requesting the translated quantum circuit. In response, at 1412, the back-end API transport 1354 may cause the translated quantum circuit to be transported to the queue 1372 of VM 1370. In some embodiments, instead of pings of a polling protocol, an edge computing device 1352 may use various other techniques to determine whether there is a quantum computing circuit ready to be transported to edge computing device 1352. Also, in some embodiments, a given quantum hardware provider may include more than one quantum computer and/or types of quantum computers. In such embodiments, a back-end API transport and/or VM interface to the QHP may route a quantum circuit that is to be executed at the quantum hardware provider to an assigned quantum computer at the quantum hardware provider.

Figure 15A:
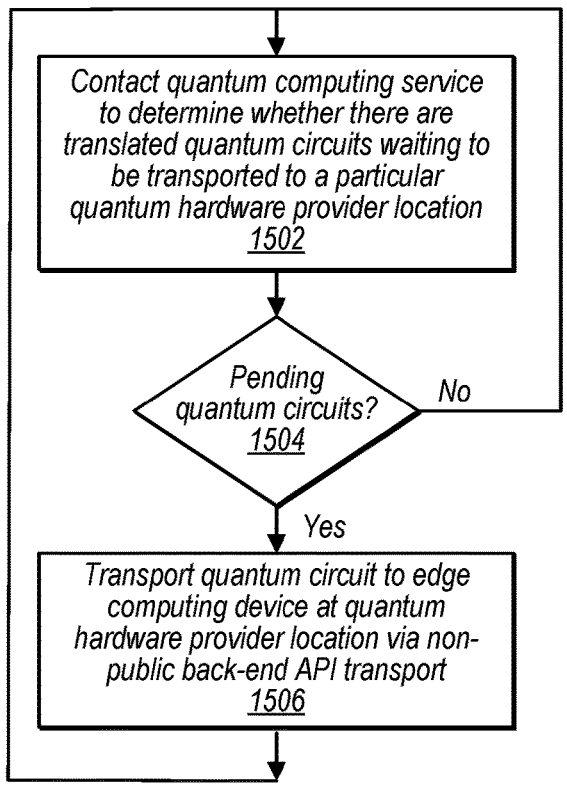
FIG. 15A, illustrates an example process for transporting quantum circuits from a quantum computing service to an edge computing device of the quantum computing service, according to some embodiments.

FIG. 15A, illustrates an example process for transporting quantum circuits from a quantum computing service to an edge computing device of the quantum computing service, according to some embodiments.

At 1502, an edge computing device contacts (e.g. pings) a quantum computing service to determine whether there are translated quantum circuits waiting to be transported to a particular quantum hardware provider location.

If it is determined at 1504, that there is a pending quantum circuit, at 1506, the edge computing device uses a back-end API of the quantum computing service to transport the quantum circuit to the edge computing device at the quantum hardware provider location.

Figure 15B:
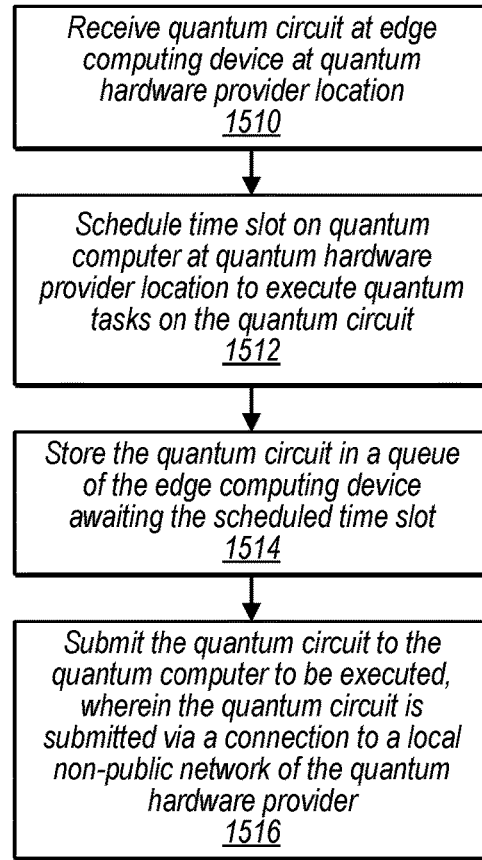
FIG. 15B, illustrates an example process for scheduling execution of a quantum circuit on a quantum computer by an edge computing device of a quantum computing service that is located at a quantum hardware provider location, according to some embodiments.

FIG. 15B, illustrates an example process for scheduling execution of a quantum circuit on a quantum computer by an edge computing device of a quantum computing service that is located at a quantum hardware provider location, according to some embodiments.

At 1510, the edge computing device receives the quantum circuit at the back-end API transport. At 1512, a scheduler 1376 of a quantum hardware provider interface VM 1370 instantiated on the edge computing device coordinates scheduling a time slot on a quantum computer at the quantum hardware provider location to execute quantum tasks using the quantum circuit. Also, concurrently the VM 1370 causes the quantum circuit to be stored in a queue 1372 awaiting the time slot.

At 1516, the VM 1370 causes the quantum circuit to be submitted to the quantum computer to be executed, wherein the quantum circuit is submitted via a connection to a local non-public network of the quantum hardware provider.

Figure 15C:
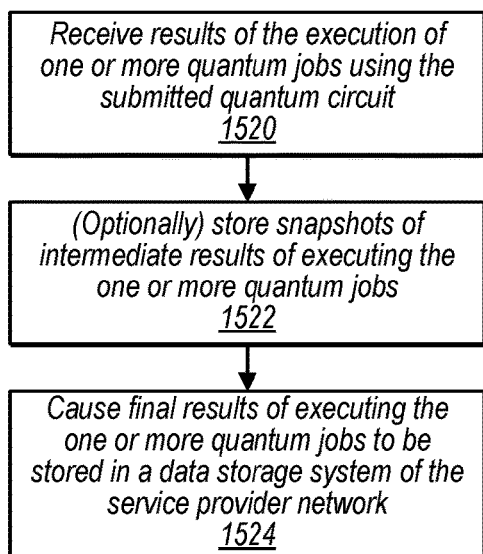
FIG. 15C, illustrates an example process for processing results of an execution of a quantum circuit on a quantum computer by an edge computing device of a quantum computing service that is located at a quantum hardware provider location, according to some embodiments.

FIG. 15C, illustrates an example process for processing results of an execution of a quantum circuit on a quantum computer by an edge computing device of a quantum computing service that is located at a quantum hardware provider location, according to some embodiments.

At 1520, a temporary bucket 1374 implemented by the VM 1370 receives results of the execution of one or more quantum jobs using the submitted quantum circuit.

At 1522, the results manager 1378 optionally causes snapshots of the results to be stored to a data storage service, such as the data storage service 336 illustrated in FIG. 3.

At 1524, the results manager 1378 causes final results of executing the one or more quantum jobs to be stored in a data storage system of the service provider network, such as the data storage service 336 illustrated in FIG. 3.

Figure 16:
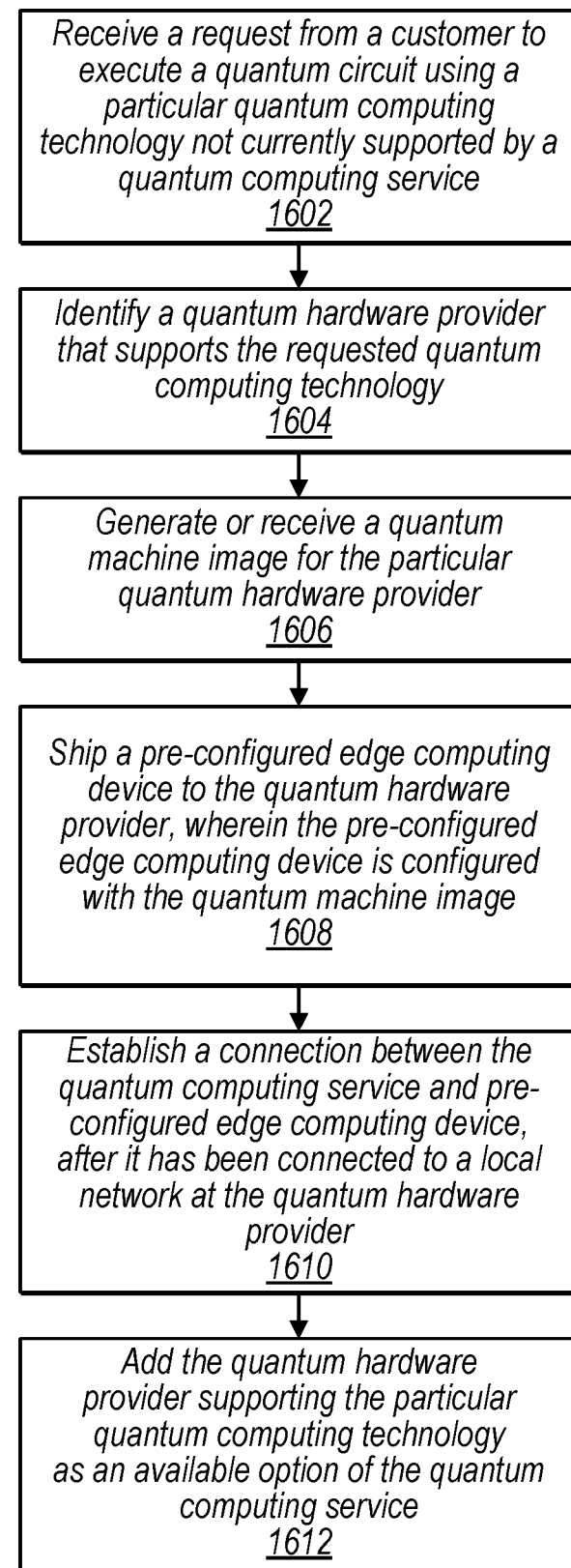
FIG. 16 illustrates an example process for adding additional quantum computing technologies, as supported quantum computing technologies, to a quantum computing service, according to some embodiments.

FIG. 16 illustrates an example process for adding additional quantum computing technologies, as supported quantum computing technologies, to a quantum computing service, according to some embodiments.

At 1602, a quantum computing service receives a request from a customer to execute a quantum circuit using a particular quantum computing technology not currently supported by a quantum computing service.

At 1604, the quantum computing service identifies a quantum hardware provider that supports the requested quantum computing technology. At 1606, the quantum computing service receives and/or the quantum hardware provider generates a quantum machine image for the particular quantum hardware provider.

At 1608, the quantum computing service ships a pre-configured edge computing device to the quantum hardware provider, wherein the pre-configured edge computing device is configured with the quantum machine image.

At 1610, the quantum computing service establishes a connection between the quantum computing service and pre-configured edge computing device, after it has been connected to a local network at the quantum hardware provider.

At 1612, the quantum computing service adds the quantum hardware provider supporting the particular quantum computing technology as an available option of the quantum computing service.

Example Configurations for Executing a Hybrid Algorithm

In some embodiments, a virtualized computing service, such as virtual compute service 326 described in FIG. 3 may include edge computing devices located at quantum hardware providers, wherein the edge computing devices are included as resources in the virtualized computing service. The edge computing device may function in part as additional resource hosts of the virtualized computing service. Compute instances, such as compute instances 322 (shown in FIG. 3) may be allocated to a customer on an edge computing device at a particular quantum hardware provider location. The compute instances implemented on the edge computing device may perform classical computing portions of a quantum computing hybrid algorithm, wherein a quantum computer, also located at the quantum hardware provider location with the edge computing device, executes quantum computing portions of the quantum computing hybrid algorithm. In some embodiments, such an edge computing device may be included at the quantum hardware provider location in addition to an edge computing device that implements a back-end API transport at the quantum hardware provider location. Also, in some embodiments, a single edge computing device at a quantum hardware provider may implement both a back-end API transport and compute instances that perform classical computing portions of a quantum computing hybrid algorithm.

In some embodiments, a quantum computing hybrid algorithm may include a classical compute portion comprising a ring of classical compute commands that determine what quantum circuit a command/job is to be submitted to, and what parameters are to be supplied to the selected quantum circuit. Also, the classical compute portion of the hybrid algorithm may receive results from the job executed on the quantum computer and then decide a subsequent quantum circuit and/or a subsequent command/job that is to be sent to the quantum computer, and what parameters are to be supplied. For example, a first set of parameters sent to a quantum circuit may be modified based on the results received from the quantum circuit and a modified set of parameters, that have been modified based on the results, may then be sent back to the quantum circuit. Also, the results may prompt a different or modified quantum circuit to be used for a subsequent command/job. In some embodiments, 100s, 1,000s, 1,000,000s of such iterations may be performed. In some embodiments, low latencies between the classical computer and the quantum computer may be necessary to efficiently execute such hybrid algorithms. In some embodiments, executing a classical compute portion of the hybrid algorithm on an edge computing device physically located in close proximity to the quantum computer may reduce such latencies such that hybrid algorithms not previously possible may be executed.

Also, in some embodiments, a customer may be provisioned multiple compute instances on a given edge computing device, wherein different ones of the compute instances (e.g. virtual machines) perform different hybrid algorithms or different jobs of a same hybrid algorithm. In some embodiments, a virtualized computing service may automatically scale up or down resources allocated to a compute instance to perform a classical portion of a hybrid algorithm. Also, the virtualized computing service may automatically scale a number of compute instances allocated to a customer based on required resources to execute a hybrid algorithm.

For example, in some embodiments, a customer may be allocated a cluster of compute instances implemented on one or more edge computing devices located at a quantum hardware provider location. In some embodiments, some jobs of a classical compute portion of a hybrid algorithm may be performed by other compute instances of the virtualized computing service that are located in a data center and connected to the edge computing device via a high-speed connection, such as a non-public dedicated physical network link, such as a direct connection.

In some embodiments, excess computing capacity of an edge computing device located at a quantum hardware provider may be provisioned to the quantum hardware provider as compute instances allocated to the quantum hardware provider. In some embodiments, the quantum hardware provider may outsource some computing tasks to such compute instances. In some embodiments, the compute instances may be allocated to the quantum hardware provider without reservation, such that if needed to scale up a customer's virtual machines executing a hybrid algorithm, resources may be reclaimed for this purpose.

For example, an example hybrid algorithm that may be performed using a quantum computing service that supports hybrid algorithm execution using co-located edge computing devices is a variational quantum Eigen solver algorithm.

Also in some embodiments, a customer may define a machine image instance to be used for a virtual machine that is to be used to execute a classical computing portion of a hybrid algorithm. The customer may save the machine image to a data storage service of a service provider network, such as a block storage service associated with a virtual compute service, and the virtual compute service may boot the customer's virtual machine using the machine image supplied by the customer.

Figure 17:
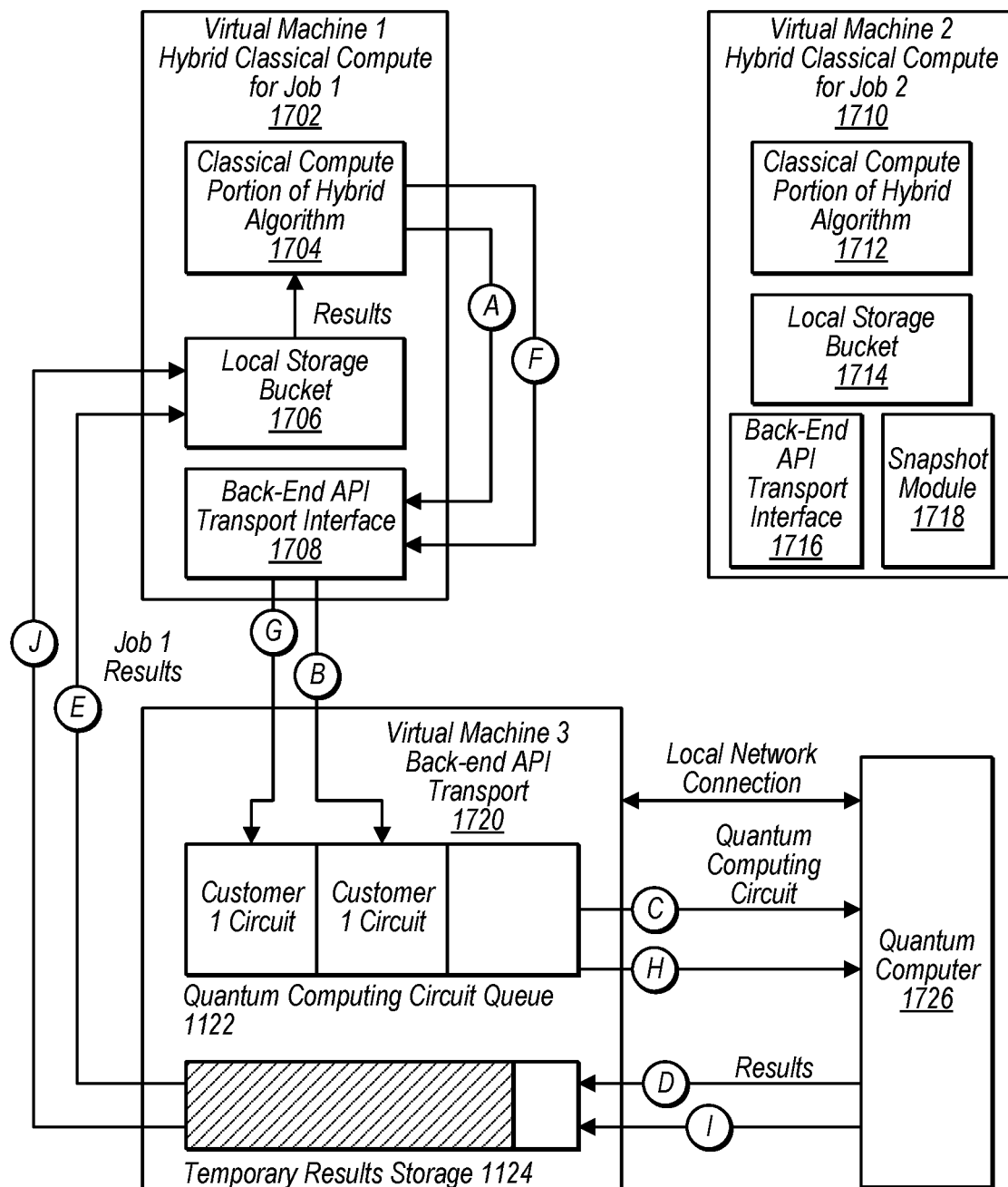
FIG. 17, illustrates example interactions between a classical computer implemented on an edge computing device of a quantum computing service, located at a quantum hardware provider location, and a quantum computer at the quantum hardware provider location, according to some embodiments.

FIG. 17, illustrates example interactions between a classical computer implemented on an edge computing device of a quantum computing service, located at a quantum hardware provider location, and a quantum computer at the quantum hardware provider location, according to some embodiments.

FIG. 17 illustrates a first virtual machine 1702 and a second virtual machine 1710. In some embodiments, VM 1702 and VM 1710 may be two virtual machines implemented on an edge computing device located at a quantum hardware provider. Also, VM 1720 could also be implemented on the same edge computing device at the quantum hardware provider, or may be implemented on a separate edge computing device at the quantum hardware provider. In some embodiments, VM 1702 and VM 1710 may be allocated to the same customer to perform two different jobs of a hybrid algorithm or multiple hybrid algorithms. Also, in some embodiments, an edge computing device at a quantum hardware provider location may support multi-tenancy, and VM 1702 and VM 1710 may be allocated to different customers.

In some embodiments, VM 1702 comprises an application/environment/module 1704 that executes a classical compute portion of a hybrid algorithm. Also, VM 1702 may include a local storage bucket 1706 that accesses results data stored in a memory of the edge computing device. Additionally, VM 1702 includes a back-end API transport interface 1708 that coordinates with virtual machine 3 back-end API transport 1720 to submit quantum computing tasks to the back-end API transport. The back-end API transport 1720 may include a quantum computing circuit queue 1122 and temporary results storage 1124, similar to as described in FIG. 11. Virtual machine 3 that implements back-end API transport 1720 may coordinate scheduling quantum computing tasks submitted from VM 1702 to be executed on quantum computer 1726 that is co-located at a quantum hardware provider facility with one or more edge computing devices that implement VMs 1702, 1710, and 1720.

In some embodiments, VM 1710 may include similar components as VM 1702. For example, VM 1710 may include classical compute application/environment/module 1712, local storage bucket 1714, and back-end API transport interface 1716. In some embodiments, VM 1702 and/or VM 1710 may include a snapshot module 1718, that causes snapshots of intermediate results of the execution of a hybrid algorithm on quantum computer 1726 to be stored as snapshots. The snapshots may be stored to a remote data storage service, such as the snapshots objects 328 stored in object-based storage service 336 illustrated in FIG. 3.

In some embodiments, at "step A" classical compute module 1704 may submit a job/command to back-end API transport interface 1708. This may cause, at "step B", the job and/or associated quantum circuit to be added to quantum computing circuit queue 1122. Then, at "step C", the back-end API transport 1720 may cause the job to be submitted to quantum computer 1726. At "step D", the back-end API transport 1720 may receive the results of executing the job and at "step E" make a locally stored version of the results available to the classical compute module 1704 via local storage bucket 1706. The classical compute module 1704 may then use the results to generate a next command/job and at "step F" submit the next command/job to the back-end API transport interface 1708, which at "step G" may cause the next job/quantum circuit to be added to the quantum computing circuit queue 1122. At "step H" the back-end API transport 1720 may cause the next job/command to be executed on the quantum computer 1726 and at "step I" results may be returned to the back-end API interface 1720. At "step J" the results may be made available to the classical computing module 1704 via local storage bucket 1706. In some embodiments, this process may be repeated 100s, 1,000s, or 10,000s of times, etc. until one or more thresholds are met, such as the completion of an optimization problem.

Figure 18:
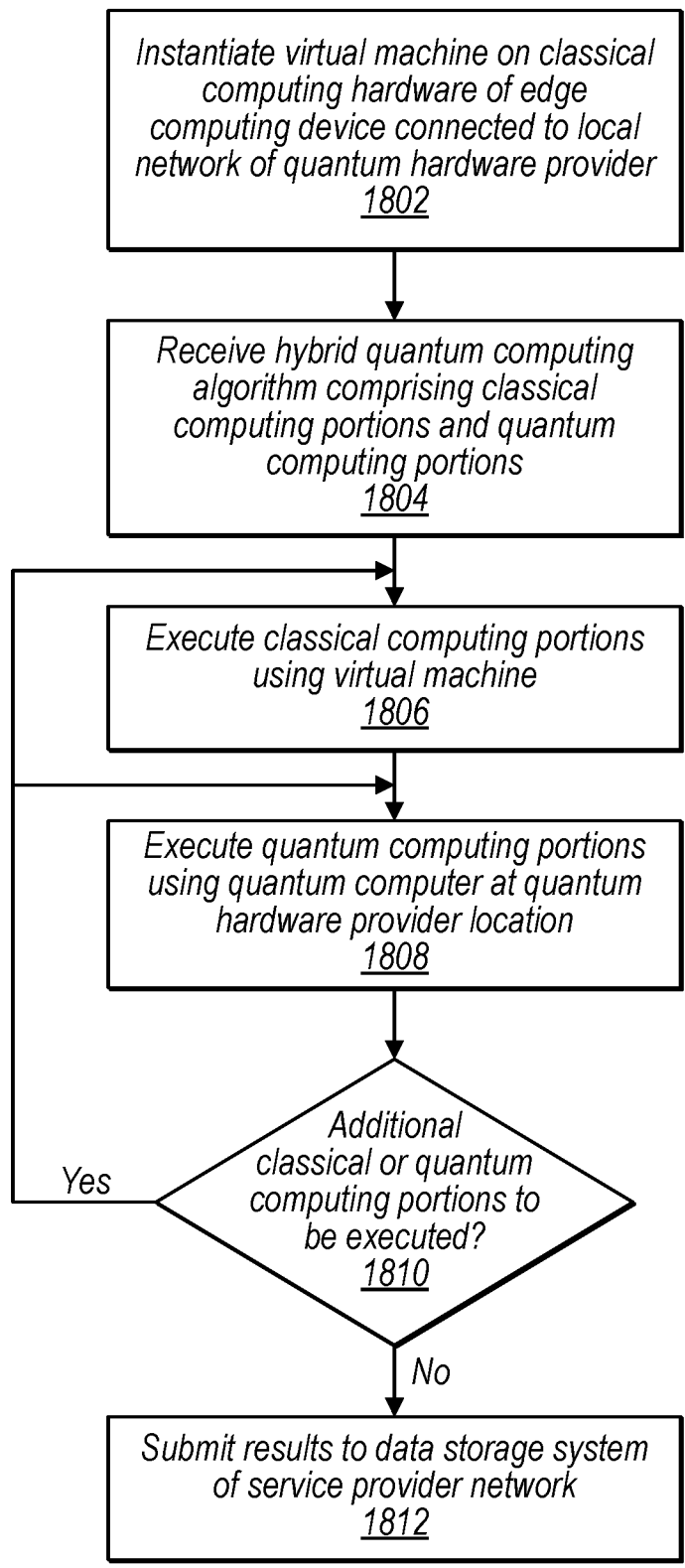
FIG. 18 illustrates an example process for executing a hybrid algorithm using an edge computing device of a quantum computing service, located at a quantum hardware provider location, according to some embodiments.

FIG. 18 illustrates an example process for executing a hybrid algorithm using an edge computing device of a quantum computing service, located at a quantum hardware provider location, according to some embodiments.

At 1802, the quantum computing service causes a virtual machine to be instantiated on classical computing hardware of an edge computing device physically located at quantum hardware provider location and connected to a local network of the quantum hardware provider.

At 1804, the quantum computing service receives a hybrid quantum computing algorithm comprising classical computing portions and quantum computing portions. For example, in some embodiments, the quantum algorithm development kit 114, illustrated in FIG. 4 may further include a design paradigm for defining a quantum algorithm. In such embodiments, a customer may define a quantum algorithm and submit the quantum algorithm for execution, which in turn may cause the process described in FIG. 18 to be carried out by the quantum computing service on behalf of the customer.

At 1806, the quantum computing service causes the classical computing portions of the hybrid algorithm to be executed on the instantiated virtual machine. Note that in some embodiments, a bare-metal instance may be used in place of a virtual machine.

At 1808, the quantum computing service executes quantum computing portions using quantum computer at quantum hardware provider location.

At 1810, the virtual machine executing the hybrid algorithm determines whether there are additional classical or quantum computing portions to be executed. If so, steps 1806 and/or 1808 are repeated. If not, at 1812, the quantum computing service submits results to a data storage system of service provider network.

Example Management Components that May be Included in a Virtualization Offloading Card of an Edge Computing Device Located at a Quantum Hardware Provider Location.

FIG. 19 illustrates example virtualization management software components which may be executed at a virtualization offloading card included in an edge computing device, according to some embodiments. The set of virtualization management software components 1902 run at the virtualization offloading card cores/processors, which may include an embedded operating system 1904 (which may orchestrate the operations of the various hardware elements of the virtualization offloading card itself), one or more network interface card (NIC) emulators 1906 as well as one or more emulators 1908 for legacy devices.

Block-device storage managers 1910 run at the virtualization offloading card may, for example, configure root volumes for compute instances run on an edge computing device at a quantum hardware provider location using a local persistent storage server system, such as SSDs. NVME device emulators 1912 may be used to manage accesses to NVME-based persistent storage in some embodiments. IVN data plane connectivity managers 1914 may, for example, implement operations of the encapsulation protocol (such as encapsulating outbound packets, or de-capsulating inbound packets) used for traffic between compute instances of the edge computing device and other endpoints. Such other endpoints may include, for example, other compute instances within service provider network data centers, services other than the virtualized computing service, and so on. Calls to a VPC mapping service may be initiated from the IVN data plane connectivity managers 1914. In some embodiments, the IVN data plane connectivity managers may initiate or implement configuration operations to assign network addresses within an IVN to one or more virtual network interfaces that are programmatically attached to a compute instance running at an edge computing device at a quantum hardware provider location, thus including the compute instance within the network address range designated for the IVN by a customer.

Instance metadata service agents 1916 may provide various elements of metadata in response to queries issued from a compute instance launched at the edge computing device in some embodiments. Such metadata may, for example, include credentials for authorizing/validating requests sent to other provider network services from the compute instance, block device mappings information of the compute instance, an identifier of the compute instance, and so on. In some embodiments, a link-local HTTP address accessible only from within the instance itself may be used to obtain the metadata at the compute instance.

In at least some embodiments, one or more agents 1918 of the VCS control plane may run at the virtualization offloading card of the edge computing device. Such agents may be responsible for receiving commands generated at the VCS control plane, for example, and initiating operations (e.g., configuration change operations) at the virtualization offloading card and/or the edge computing device in response to such commands.

In at least one embodiment, one or more networks security agents 1920 may be run at the virtualization offloading card of the edge computing device. Such network security agents may be responsible for a number of operations, such as causing log records to be generated for various kinds of traffic (including DNS requests and responses, as well as standard IP packets) directed to or from a compute instance at the edge computing device, initiating or performing intrusion detection or exfiltration detection operations, and the like. It is noted that in some embodiments, a different combination of software and/or firmware components may be run at a virtualization offloading card of an edge computing device located at a quantum hardware provider location than that shown by way of example in FIG. 19.

Example Use of Provider Network Services Via Edge Computing Device

Figure 20:
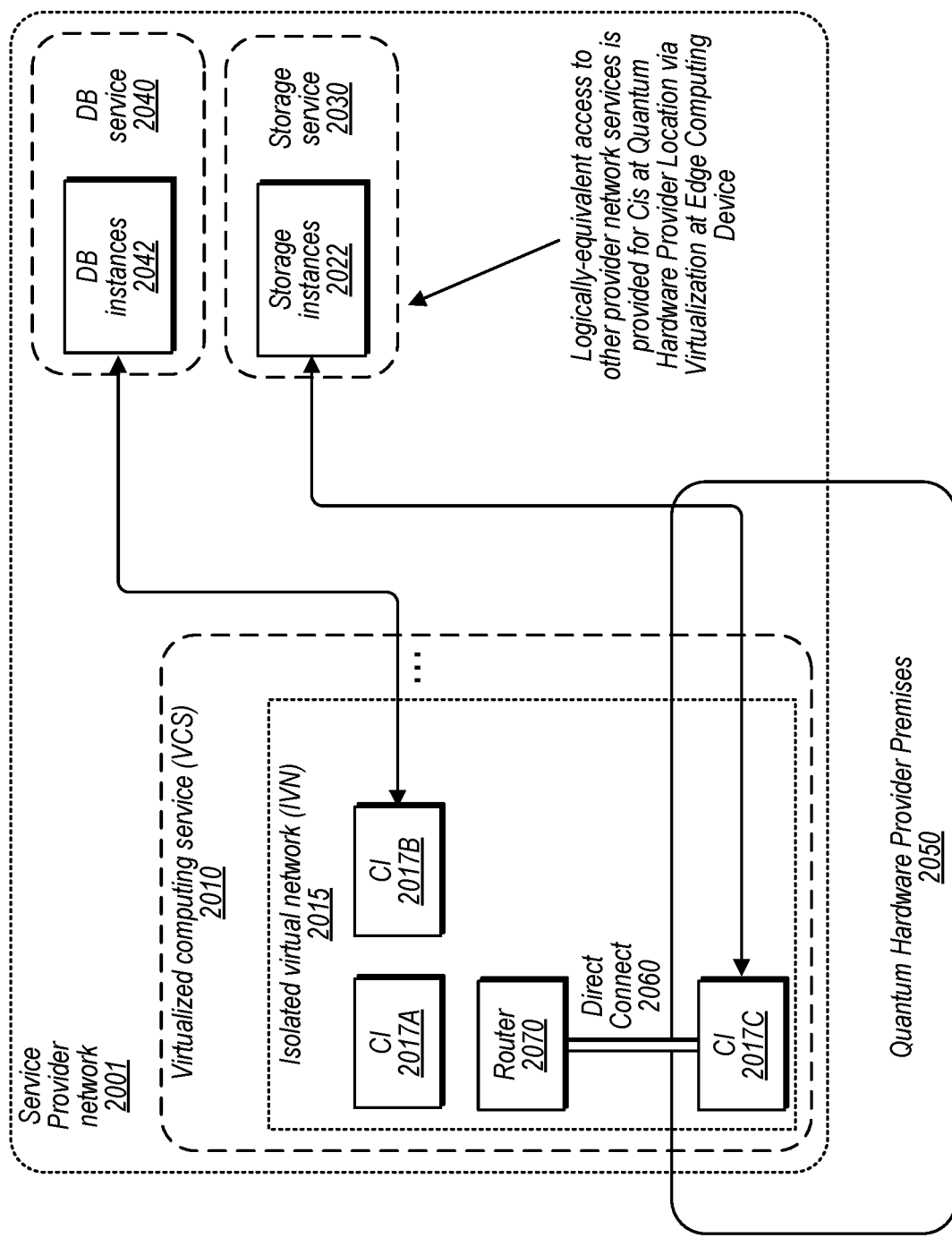
FIG. 20 illustrates an example network configuration for an isolated virtual network that includes an edge computing device of a quantum computing service, located at a quantum hardware provider location, according to some embodiments.

FIG. 20 illustrates an example network configuration for an isolated virtual network that includes an edge computing device of a quantum computing service, located at a quantum hardware provider location, according to some embodiments.

In some embodiments, a provider network at which a virtualized computing service is implemented may also provide access to other higher-level network-accessible services that utilize VCS compute instances as building blocks—for example, an instance of a database may be implemented using a compute instance of the VCS, and offered for use by clients of a network-accessible database service.

In the depicted embodiment, provider network 2001 comprises at least a virtualized computing service (VCS) (similar in functionality and features to VCS 326 of FIG. 3), a storage service 2030 (similar in functionality and features to object-based storage service 336 of FIG. 3), and a database service 2040 (that may be included in other-network-based service 338 of FIG. 3).

In the example scenario depicted in FIG. 20, an isolated virtual network (IVN) 2015 of the kind discussed earlier has been established for a VCS customer. IVN 2015 comprises a plurality of compute instances, such as CIs 2017A and 12017B implemented on computing devices at a data center of the service provider network 2001 and CI 2017C implemented on an edge computing device located at a quantum hardware provider location 2050. In some embodiments a dedicated physical connection 2060 may connect an edge computing device to a router 2070 included in a data center of the service provider network 2001. The compute instances (CI 2017A, 2017B and 2017C) are included within the VCS 2010. Programs running at any of the CIs may utilize resources of other provider network services in the depicted embodiment. For example, storage instances 2022 of storage service 2030 may be accessed from CI 2017B in the service provider network; similarly, database instances 2042 of database service 2040 may be accessed from CI 2017C within the service provider network. In some embodiments, a virtualization offloading card included in an edge computing device instantiate compute instance 2017C and/or may manage communications with storage instances 2022 or database instances 2042, in some embodiments.

Illustrative Shippable Edge-Computing Device

Figure 21:
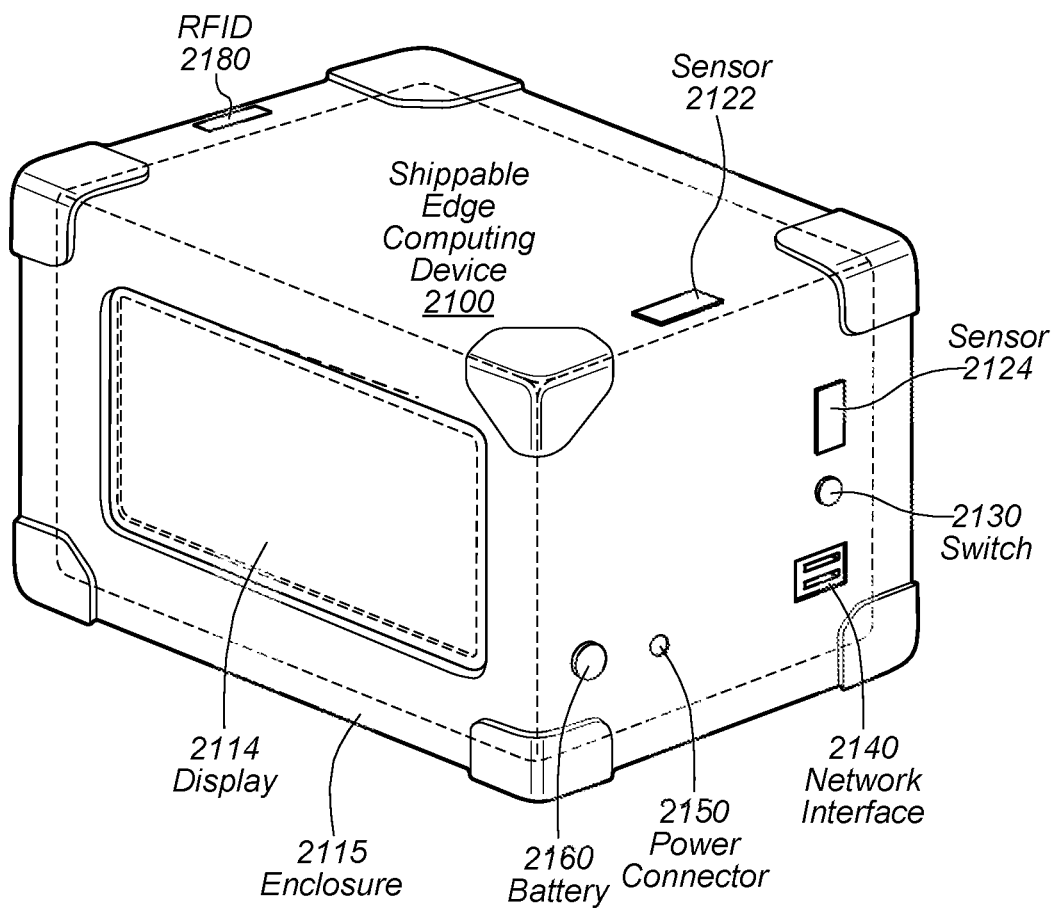
FIG. 21 illustrates an example shippable pre-configured edge computing device of a quantum computing service, according to some embodiments.

FIG. 21 illustrates an example shippable pre-configured edge computing device of a quantum computing service, according to some embodiments.

FIG. 21 illustrates a shippable edge computing device 2100, according to some embodiments. The depicted shippable edge computing device 2100 may be shipped to a quantum hardware provider as a pre-configured edge device that can be connected to a local network of the quantum hardware provider to enable the quantum hardware provider to be included as an available quantum hardware provider of a quantum computing service. Embodiments of the shippable edge computing device 2100 may include more, less, or different features or components than those depicted, in some embodiments.

In the depicted embodiment, shippable edge computing device 2100 includes an enclosure 2115 surrounding persistent storage. memory, and processing components. The enclosure may be ruggedized (e.g., according to various standards, such as military standards or electronics industry standards) and may be configured with an outward-facing electronic display 2114 such that the enclosure, and the electronic display form a self-contained shipping container suitable for shipping without any additional packaging, labeling or the like and such that the electronic display 2114 acts as to display a destination location (e.g., in lieu of a shipping label). In some embodiments, the enclosure 2115 and the display 2114 act as reusable shipping components in lieu of cardboard boxes and shipping labels. The enclosure may include various mechanisms to facilitate movement of the shippable edge computing device 2100, such as rollers, handles or the like.

The shippable edge computing device 2100 is illustrated with battery 2160 and power connector 2150 for powering some or all of the components of the shippable edge computing device 2100 that require power to function. The power connector 2150 may be configured to connect the shippable edge computing device 2100 to an external power source, in some embodiments. The power connector may power the shippable edge computing device, in some embodiments.

The shippable edge computing device 2100 is illustrated with network interface 2140. The network interface 2140 may act as interface between the shippable edge computing device 2100 and various networks, such as LANS, WANS or the like (e.g., via various protocols, such as iSCSI or Ethernet). In some embodiments, network connection 2140 may act as an interface directly to another device (e.g., via SCSI). In some instances, the network interface 2140 may include two or more different types of interfaces (e.g., RJ45, SFP, optical).

The shippable edge computing device 2100 is illustrated with switch 2130. The switch 2130 may act as an on-off power switch or as a switch to activate the display, in some embodiments.

The shippable edge computing device 2100 is illustrated with radio frequency identification (RFID) 2180. The RFID may assist with tracking the device, in some instances. For example, devices may be identified during the provisioning process via a respective RFID or devices may be identified upon receipt at the quantum hardware provider by a respective RFID. The RFID may be used to track the shippable edge computing device 2100 as the device is routed to a facility.

The shippable edge computing device 2100 is illustrated with various sensors 2122, 2124. The device may be outfitted with any of various sensors including a global positioning sensor (GPS), a temperature sensor, a humidity sensor or an accelerometer, all as non-limiting examples. Data may be collected from the sensors and used in various manners, such as to record the environment of the device (e.g., hot, cold, moderate, moist) or record various events associated with the shippable edge computing device 2100, such as a drop, quick movement, orientation or location of the shippable edge computing device 2100.

The shippable edge computing device 2100 may be configured with multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other keys used to encrypt the data on the device may be stored with the device. The encryption keys may be applied in multiple layers, in embodiments.

Figure 22:
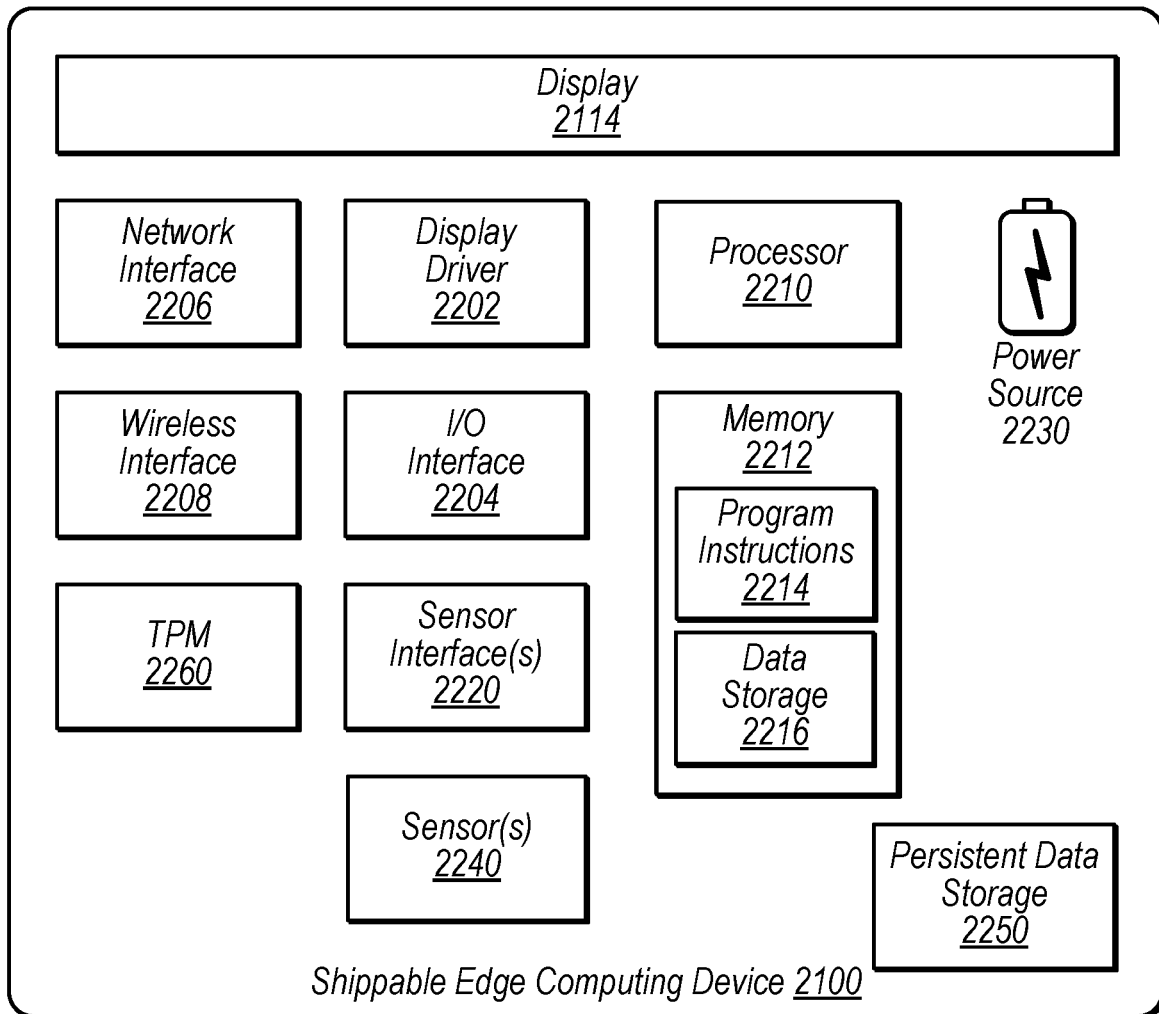
FIG. 22 is a block diagram that illustrates example components of a shippable pre-configured edge computing device of a quantum computing service, according to some embodiments.

FIG. 22 is a block diagram that illustrates example components of a shippable pre-configured edge computing device of a quantum computing service, according to some embodiments.

In FIG. 22, device 2100 is illustrated with display 2114, network interface 2206 and persistent storage 2250. In the illustrated embodiment, display driver 2202 provides an interface function between a processor 2210 and display 2114. For example, to instruct the display to display an address, processor 2210 executes computer instructions from memory 2212 that send messages to display driver 2202 that are interpreted by the display driver and cause the display driver to display the address on display 2114.

Network interface 2206 acts as an interface between an external network (e.g., a quantum hardware provider network or a service provider network) and the device. In some embodiments, the network interface is configured to transmit instructions to the device or to transmit encrypted data. Wireless interface 2208 may be configured to receive (e.g., via cellular or Wi-Fi network) instructions from the service provider. For example, the service provider may send updated address information to the shippable edge computing device 2100 via a cellular network such that the displayed address of the device is updated en route, thereby changing the destination for the device in-flight such that the device is shipped to the updated address instead of the prior address.

Input/Output (I/O) interface 2204 may be configured to coordinate I/O traffic between processor 2210, memory 2212, the display driver, network interface 2206, wireless interface 2208, sensor interface(s) 2220 and persistent storage 2250 or peripheral interface. In some embodiments, I/O interface 2204 may perform any necessary protocol, timing or other data transformations to convert data signals from one component (e.g., system memory 2212) into a format suitable for use by another component (e.g., processor 2210). In some embodiments, I/O interface 2204 may include support for devices attached through various types of peripheral buses, such as a variant of the Peripheral Component Interconnect (PCI) bus standard or the Universal Serial Bus (USB) standard, for example. In some embodiments, the function of I/O interface 2240 may be split into two or more separate components, such as a north bridge and a south bridge, for example. Also, in some embodiments, some or all of the functionality of I/O interface 2204, such as an interface to system memory 2212, may be incorporated directly into processor 2210.

The shippable edge computing device 2100 is depicted with persistent data storage 2250. Persistent data storage 2250 may include any combination of non-volatile storage such as hard drives or flash memory.

The shippable edge computing device 2100 is depicted with power source 2230 that may power the various electronic components of the shippable edge computing device 2100 and with sensor(s) 2240 and sensor interface(s) 2220. As described above, any of various sensor(s) may be incorporated into device 2100. Device 2100 may also include various sensor interface(s) 2220 that act as an interface between the sensor(s) 2240 and I/O interface 2204. The sensor interfaces may be proprietary interfaces, customized for a particular sensor, in embodiments. The sensor interfaces may perform various functions such as conversions of data, analysis of sensor output and output of information based on the analysis or the like.

The shippable edge computing device 2100 is also depicted with a trusted platform module (TPM) 2260. The TPM 2260 may provide additional security features for the shippable edge computing device 2100. For example, after the quantum hardware provider receives a TPM 2260 from a quantum service provider, the quantum hardware provider may communicate with the TPM 2260 to determine whether a change has been made to the configuration of the shippable edge computing device 2100. Changes to the shippable edge computing device 2100 configuration may indicate that the shippable edge computing device 2100 was tampered with and that a third party may have accessed data on the shippable edge computing device 2100.

Illustrative Computer System

Figure 23:
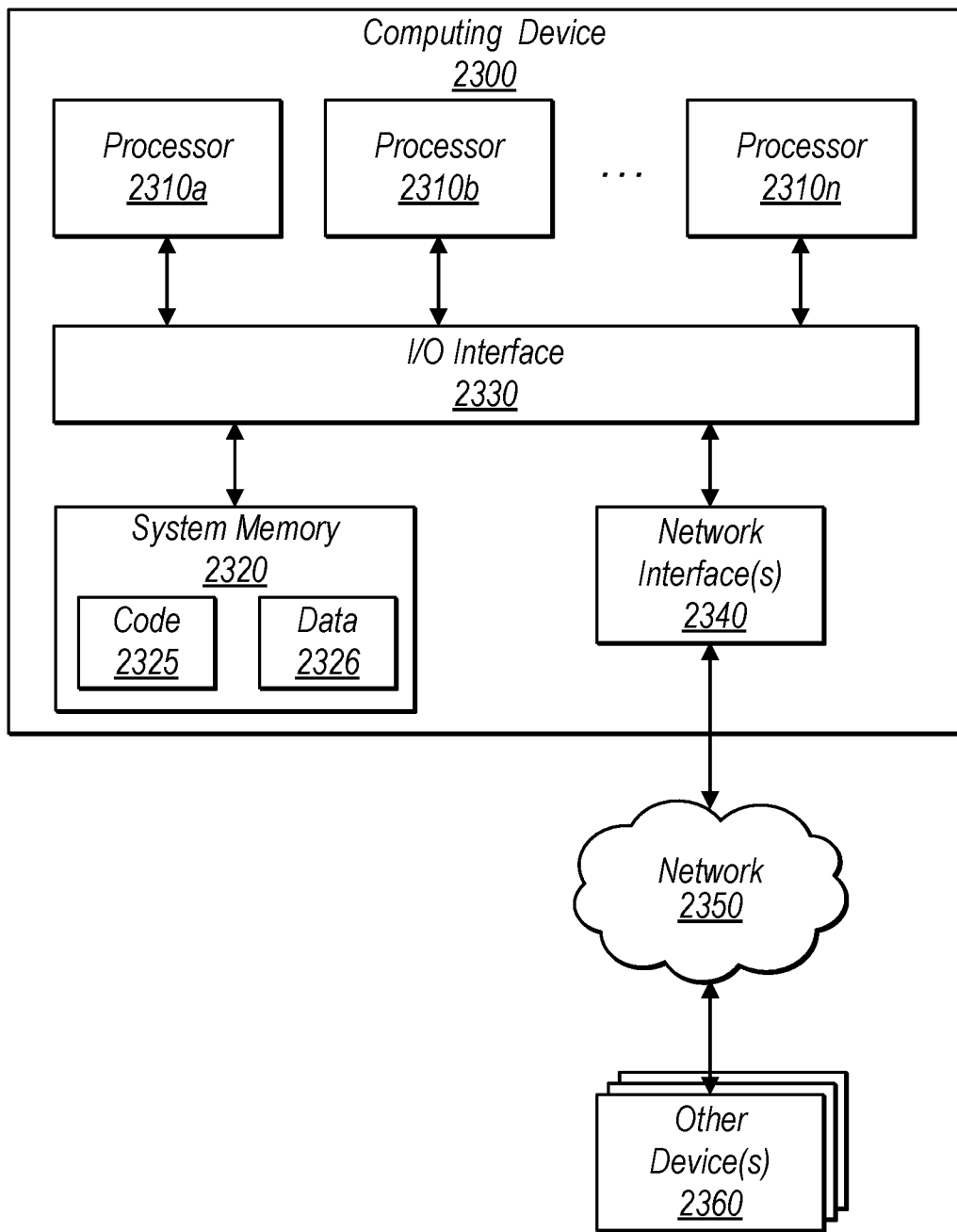
FIG. 23 is a block diagram illustrating an example computing device that may be used in at least some embodiments.

FIG. 23 is a block diagram illustrating an example computing device that may be used in at least some embodiments.

FIG. 23 illustrates such a general-purpose computing device 2300 as may be used in any of the embodiments described herein. In the illustrated embodiment, computing device 2300 includes one or more processors 2310 coupled to a system memory 2320 (which may comprise both non-volatile and volatile memory modules) via an input/output (I/O) interface 2330. Computing device 2300 further includes a network interface 2340 coupled to I/O interface 2330.

In various embodiments, computing device 2300 may be a uniprocessor system including one processor 2310, or a multiprocessor system including several processors 2310 (e.g., two, four, eight, or another suitable number). Processors 2310 may be any suitable processors capable of executing instructions. For example, in various embodiments, processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA. In some implementations, graphics processing units (GPUs) may be used instead of, or in addition to, conventional processors.

System memory 2320 may be configured to store instructions and data accessible by processor(s) 2310. In at least some embodiments, the system memory 2320 may comprise both volatile and non-volatile portions; in other embodiments, only volatile memory may be used. In various embodiments, the volatile portion of system memory 2320 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 2320 as code 2325 and data 2326.

In some embodiments, I/O interface 2330 may be configured to coordinate I/O traffic between processor 2310, system memory 2320, and any peripheral devices in the device, including network interface 2340 or other peripheral interfaces such as various types of persistent and/or volatile storage devices. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. Also, in some embodiments some or all of the functionality of I/O interface 2330, such as an interface to system memory 2320, may be incorporated directly into processor 2310.

Network interface 2340 may be configured to allow data to be exchanged between computing device 2300 and other devices 2360 attached to a network or networks 2350, such as other computer systems or devices as illustrated in FIG. 1 through FIG. 22, for example. In various embodiments, network interface 2340 may support communication via any suitable wired or wireless general data networks, such as types of Ethernet network, for example. Additionally, network interface 2340 may support communication via telecommunications/telephony networks such as analog voice networks or digital fiber communications networks, via storage area networks such as Fibre Channel SANs, or via any other suitable type of network and/or protocol.

In some embodiments, system memory 2320 may represent one embodiment of a computer-accessible medium configured to store at least a subset of program instructions and data used for implementing the methods and apparatus discussed in the context of FIG. 1 through FIG. 22. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 2300 via I/O interface 2330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 2300 as system memory 2320 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 2340. Portions or all of multiple computing devices such as that illustrated in FIG. 23 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
one or more computing devices of a service provider network, wherein the one or more computing devices are configured to implement a quantum computing service;
a first edge computing device of the service provider network located at a location of a first quantum hardware provider; and
a second edge computing device of the service provider network located at a location of a second quantum hardware provider;
wherein the first quantum hardware provider and the second quantum hardware provider are configured to execute quantum computing circuits using quantum computers based on different quantum computing technologies; and
wherein the first and second edge computing devices are configured to:
instantiate a virtual machine implemented on classical computing hardware of the respective first or second edge computing device;
receive, via the quantum computing service, a hybrid quantum computing algorithm comprising classical computing portions and quantum computing portions;
execute the classical computing portions on the virtual machine implemented on the classical computing hardware of the respective first or second edge computing device;
coordinate execution of the quantum computing portions on a quantum computer at the respective first or second quantum hardware provider location where the respective first or second edge computing device is located; and
submit results generated from executing the hybrid quantum computing algorithm to a data storage system of the service provider network, wherein one or more computing devices implementing the data storage system are located at a facility of the service provider network remote from the location of the respective first or second quantum hardware provider.

2. The system of claim 1, wherein the virtual machine implemented on the first or the second edge computing device is further configured to:
provide the quantum computing portions as one or more translated quantum computing circuits to be executed on the quantum computer at the respective first or second quantum hardware provider location,
wherein the one or more translated quantum computing circuits are translated into a format in accordance with a quantum computing technology of the quantum computer at the respective first or second quantum hardware provider location, and
wherein the one or more translated quantum computing circuits are provided to a back-end application programmatic interface (API) transport of the quantum computing service, wherein the back-end API transport interface is a non-public interface that schedules the one or more translated quantum computing circuits for execution on the quantum computer at the respective first or second quantum hardware provider location.

3. The system of claim 2, wherein the first or second edge computing device is further configured to:
implement a virtual storage device configured to store intermediate results generated from the execution of the one or more translated quantum computing circuits that have been executed by the quantum computer at the respective first or second quantum hardware provider location;
receive the intermediate results from the quantum computer at the first or second quantum hardware provider location; and
provide access to the intermediate results to the virtual machine executing the classical computing portions of the hybrid quantum computing algorithm.

4. The system of claim 3, wherein the first or second edge computing devices are further configured to:
create snapshot copies of the intermediate results; and
cause the snapshot copies to be stored at the data storage system of the service provider network.

5. The system of claim 1, wherein the first and second edge computing devices are directly connected to a local network at the respective first or second quantum hardware provider location, wherein the quantum computer of the first or second quantum hardware provider, respectively, is also connected to the local network.

6. An edge computing device, comprising:
a first network connector configured to couple with a local network of a quantum hardware provider;
a second network connector configured to connect to a quantum computing service; and
classical computing hardware comprising:
one or more processors; and a memory storing program instructions, that when executed on or across the one or more processors, cause the one or more processors to:
  instantiate a virtual machine implemented on the classical computing hardware of the edge computing device;
  receive, from a quantum computing service via the second connector, a hybrid quantum computing algorithm comprising classical computing portions and quantum computing portions;
  execute the classical computing portions on the virtual machine implemented on the classical computing hardware of the edge computing device;
  coordinate, via the first connector coupled to the local network of the quantum hardware provider, execution of the quantum computing portions on a quantum computer at a location of the quantum hardware provider where the edge computing device is located; and
  submit, via the second connector, results generated from executing the hybrid quantum computing algorithm to a data storage system of a service provider network that includes the quantum computing service, wherein one or more computing devices implementing the data storage system are located at a facility of the service provider network remote from the location of the quantum hardware provider.

7. The edge computing device of claim 6, wherein the virtual machine implemented on the edge computing device is further configured to:
  receive, from the quantum computing service as part of the hybrid computing algorithm, one or more translated quantum computing circuits for the quantum computing portions of the hybrid computing algorithm, wherein the translated quantum computing circuits are to be executed on the quantum computer at the location of the quantum hardware provider as part of executing the hybrid computing algorithm,
  wherein the one or more translated quantum computing circuits are received translated into a format in accordance with a quantum computing technology of the quantum computer at the location of the quantum hardware provider, and
  wherein the one or more translated quantum computing circuits are provided to a back-end application programmatic interface (API) transport of the quantum computing service, wherein the back-end API transport interface is a non-public interface that provides the one or more translated quantum computing circuits the edge computing device, or another edge computing device, that is configured to schedule the one or more translated quantum computing circuits for execution on the quantum computer at the location of the quantum hardware provider.

8. The edge computing device of claim 6, wherein the program instructions when executed on the one or more processors are further configured to:
  scale up or down resources allocated to performing the classical computing portions of the hybrid quantum computing algorithm.

9. The edge computing device of claim 6, wherein the classical computing hardware is further configured to support multi-tenancy, wherein the program instructions, when executed on or across the one or more processors cause the one or more processors to:
  instantiate another virtual machine implemented on the classical computing hardware of the edge computing device;
  receive, via the second connector, another hybrid quantum computing algorithm comprising classical computing portions and quantum computing portions from the quantum computing service;
  execute the classical computing portions on the other virtual machine implemented on the classical computing hardware of the edge computing device;
  coordinate, via the first connector coupled to a local network of the quantum hardware provider, execution of the quantum computing portions of the other hybrid quantum computing algorithm on the quantum computer at the location of the quantum hardware provider where the edge computing device is located; and
  submit, via the second connector, results generated from executing the hybrid quantum computing algorithm to a second storage bucket of the data storage system of the service provider network,
  wherein the virtual machine and the other virtual machine execute different hybrid quantum computing algorithms for different customers of the quantum computing service, and
  wherein the results of the hybrid quantum computing algorithm executed on the virtual machine are stored to a first storage bucket of the data storage system that is separate from the second storage bucket where the results of the other hybrid quantum computing algorithm are stored.

10. The edge computing device of claim 6, wherein the program instructions, when executed on or across the one or more processors, cause the one or more processors to:
  cause the edge computing device to store intermediate results of the hybrid quantum computing algorithm in a local storage of the edge computing device; and
  provide the virtual machine executing the classical computing portions of the hybrid quantum computing algorithm access to the intermediate results.

11. The edge computing device of claim 10, wherein the program instructions, when executed on or across the one or more processors further cause the one or more processors to:
  create snapshot copies of the intermediate results; and
  cause the snapshot copies to be stored in the data storage system of the service provider network.

12. The edge computing device of claim 6, wherein the program instructions, when executed on or across the one or more processors are further configured to:
  instantiate, using excess classical computing capacity of the edge computing device, one or more additional virtual machines for use by the quantum hardware provider.

13. The edge computing device of claim 6, wherein the program instructions, when executed on or across the one or more processors are further configured to:
  instantiate one or more additional virtual machines for use by a quantum computer simulator using classical computing capacity of the edge computing device; and
  configure the quantum computer simulator to simulate a quantum computer based on a same quantum computing technology as the quantum computer at the quantum hardware provider location.

14. The edge computing device of claim 6, wherein the edge computing device further comprises:
  additional program instructions that when executed on or across the one or more processors of the edge computing device implement (a) one or more storage managers, and (b) one or more networking managers;

wherein the edge computing device is configured to:

establish connectivity with a substrate network of a virtualized computing service of the service provider network, wherein an encapsulation protocol implemented at a plurality of computing devices attached to the substrate network is used to transmit traffic between one or more logical networks of the virtualized computing service; and initiate one or more configuration operations to launch the virtual machine at the edge computing device, wherein the virtual machine is configured within an isolated virtual network of the service provider network based, at least in part, on operations performed using the one or more networking managers, and wherein the virtual machine is provided access to a root volume based at least in part on operations performed by the one or more storage managers.

15. The edge computing device of claim 14, wherein the edge computing device is configured to communicate with devices external to the hardware provider location via the second network connector using an encrypted communication format.

16. A method, comprising:

instantiating a virtual machine implemented on classical computing hardware of an edge computing device located at a quantum hardware provider location and connected to a quantum computing service implemented via one or more computing devices at a location remote from the quantum hardware provider location;

receiving, via the quantum computing service, a hybrid quantum computing algorithm comprising classical computing portions and quantum computing portions;

executing the classical computing portions on the virtual machine implemented on the classical computing hardware of the edge computing device located at the quantum hardware provider location;

coordinating execution of the quantum computing portions on a quantum computer at the quantum hardware provider location; and submitting results generated from executing the hybrid quantum computing algorithm to a data storage system, wherein one or more computing devices implementing the data storage system are located remote from the quantum hardware provider location.

17. The method of claim 16, further comprising:

providing one or more quantum computing circuits of the hybrid algorithm to a back-end application programmatic interface (API) transport interface of the quantum computing service, wherein the back-end API transport interface is a non-public interface that provides the one or more quantum computing circuits to another virtual machine implemented on the edge computing device, or another edge computing device, that is configured to schedule the one or more quantum computing circuits for execution on the quantum computer at the quantum hardware provider location.

18. The method of claim 17, wherein access to the edge computing device is limited to:

encrypted communications sent or received via a first port connected to the quantum computing service; and communications with the local network at the quantum hardware provider location.

19. The method of claim 16, further comprising:

receiving, at the edge computing device, intermediate results from the quantum computer at the quantum hardware provider location;

storing the intermediate results in a memory of the edge computing device located at the quantum hardware provider location; and providing access to the intermediate results to the virtual machine executing the classical computing portions of the hybrid quantum computing algorithm.

20. The method of claim 19, further comprising:

generating snap shot copies of the intermediate results; and causing the snapshot copies to be stored to a storage service.

* * * * *